United States Patent
Asai

(10) Patent No.: US 10,394,499 B2
(45) Date of Patent: *Aug. 27, 2019

(54) COMPUTER READABLE RECORDING MEDIUM, INFORMATION PROCESSING APPARATUS, AND INFORMATION PROCESSING METHOD FOR DISPLAYING CONVERTED IMAGE DATA

(71) Applicant: BROTHER KOGYO KABUSHIKI KAISHA, Nagoya-shi, Aichi-ken (JP)

(72) Inventor: Norihiko Asai, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 74 days.

This patent is subject to a terminal disclaimer.

(21) Appl. No.: 15/355,939

(22) Filed: Nov. 18, 2016

(65) Prior Publication Data

US 2017/0139653 A1 May 18, 2017

Related U.S. Application Data

(63) Continuation of application No. 13/358,458, filed on Jan. 25, 2012, now Pat. No. 9,501,246.

(30) Foreign Application Priority Data

Mar. 25, 2011 (JP) .................................. 2011-068995

(51) Int. Cl.
G06F 3/12 (2006.01)

(52) U.S. Cl.
CPC .......... *G06F 3/1224* (2013.01); *G06F 3/1205* (2013.01); *G06F 3/125* (2013.01);
(Continued)

(58) Field of Classification Search
None
See application file for complete search history.

(56) References Cited

U.S. PATENT DOCUMENTS

| 6,046,818 A | 4/2000 | Benson |
| 6,567,828 B2 * | 5/2003 | Inohara ................. G06F 16/116 |
| | | 707/809 |

(Continued)

FOREIGN PATENT DOCUMENTS

| JP | 2001-216113 A | 8/2001 |
| JP | 2002-373215 A | 12/2002 |

(Continued)

OTHER PUBLICATIONS

Japanese Patent Office, Notification of Reason for Refusal for Japanese Patent Application No. 2011-069003 (counterpart Japanese patent application), dated Mar. 12, 2013. Cited in related U.S. Appl. No. 13/408,938.

(Continued)

*Primary Examiner* — Hilina K Demeter
(74) *Attorney, Agent, or Firm* — Merchant & Gould P.C.

(57) ABSTRACT

A recording medium storing an information processing program executed by a computer of an information processing system including a transmitting unit, a storing unit and a display unit, the program includes: a transmission control instruction that causes the transmitting unit to transmit first-kind data which is data having a first format designated as target data; a second-kind-data-storage control instruction that causes the storing unit to store second-kind data in association with a first data name of the first-kind data transmitted by the transmitting unit, the second-kind data being generated in a second format by converting the first-kind data transmitted by the transmitting unit, and being received from an external apparatus; and a first display control instruction that causes the display unit to display a (Continued)

display image generated using the second-kind data stored by the second-kind-data storing unit, together with the first data name associated with the second-kind data.

18 Claims, 17 Drawing Sheets

(52) U.S. Cl.
CPC .......... *G06F 3/1208* (2013.01); *G06F 3/1256* (2013.01); *G06F 3/1292* (2013.01)

(56) References Cited

U.S. PATENT DOCUMENTS

| | | | |
|---|---|---|---|
| 8,040,545 | B2 | 10/2011 | Kim |
| 8,049,906 | B2 | 11/2011 | Akiyama |
| 8,259,338 | B2 * | 9/2012 | Kim .................. G06F 3/1204 358/1.13 |
| 2002/0021310 | A1 | 2/2002 | Nakai et al. |
| 2003/0096581 | A1 | 5/2003 | Takamine |
| 2003/0174357 | A1 | 9/2003 | Lester et al. |
| 2003/0184803 | A1 * | 10/2003 | Yamada ............. H04N 1/33307 358/1.16 |
| 2004/0003121 | A1 | 1/2004 | Tanimoto |
| 2004/0205636 | A1 | 10/2004 | Kasahara et al. |
| 2004/0253990 | A1 | 12/2004 | McCoog et al. |
| 2006/0028667 | A1 | 2/2006 | Saito |
| 2006/0066899 | A1 | 3/2006 | Yoshida |
| 2006/0224937 | A1 | 10/2006 | Sudoh et al. |
| 2008/0137126 | A1 | 6/2008 | Yoshida |
| 2009/0043905 | A1 | 2/2009 | Aoki et al. |
| 2009/0168100 | A1 | 7/2009 | Huster |
| 2009/0103124 | A1 | 8/2009 | Kimura et al. |
| 2010/0118344 | A1 | 5/2010 | Asano |
| 2010/0231968 | A1 * | 9/2010 | Hirasawa ............. G06F 3/1204 358/1.15 |
| 2011/0007344 | A1 | 1/2011 | Wilson et al. |
| 2011/0007347 | A1 | 1/2011 | Kamath et al. |
| 2011/0157621 | A1 | 6/2011 | Fu et al. |
| 2011/0194135 | A1 | 8/2011 | Hamilton et al. |
| 2012/0113461 | A1 | 5/2012 | Tsuchida |
| 2012/0243048 | A1 | 9/2012 | Asai |

FOREIGN PATENT DOCUMENTS

| | | |
|---|---|---|
| JP | 2003-167697 A | 6/2003 |
| JP | 2003-308312 A | 10/2003 |
| JP | 2005-018411 A | 1/2005 |
| JP | 2006-111799 A | 4/2006 |
| JP | 2006-235735 A | 9/2006 |
| JP | 2007-018316 A | 1/2007 |
| JP | 2007-245500 A | 9/2007 |
| JP | 2009-077283 A | 4/2009 |
| JP | 2009-145974 A | 7/2009 |
| JP | 2009-151468 A | 7/2009 |

OTHER PUBLICATIONS

Yoshida, Hidetoshi, In-Depth Explanation of Cutting-Edge Technology of DTP, DTP Technology File, Professional DTP, Japan, Kohgaku-Sha Co., Ltd., Jun. 1, 2002, Jun. 2002 Edition, First Issue, pp. 84-88. Cited in related U.S. Appl. No. 13/408,938.

U.S. Office Action issued in related U.S. Appl. No. 13/408,938, dated Aug. 29, 2013.

U.S. Office Action issued in related U.S. Appl. No. 13/408,938, dated Apr. 11, 2014.

Office Action (Notice of Allowance) issued in related U.S. Appl. No. 13/408,938, dated Feb. 10, 2015.

Japan Patent Office, Notification of Reasons for Refusal for Japanese Patent Application No. 2011-068995 (counterpart to above-captioned patent application), dated Apr. 9, 2013.

* cited by examiner

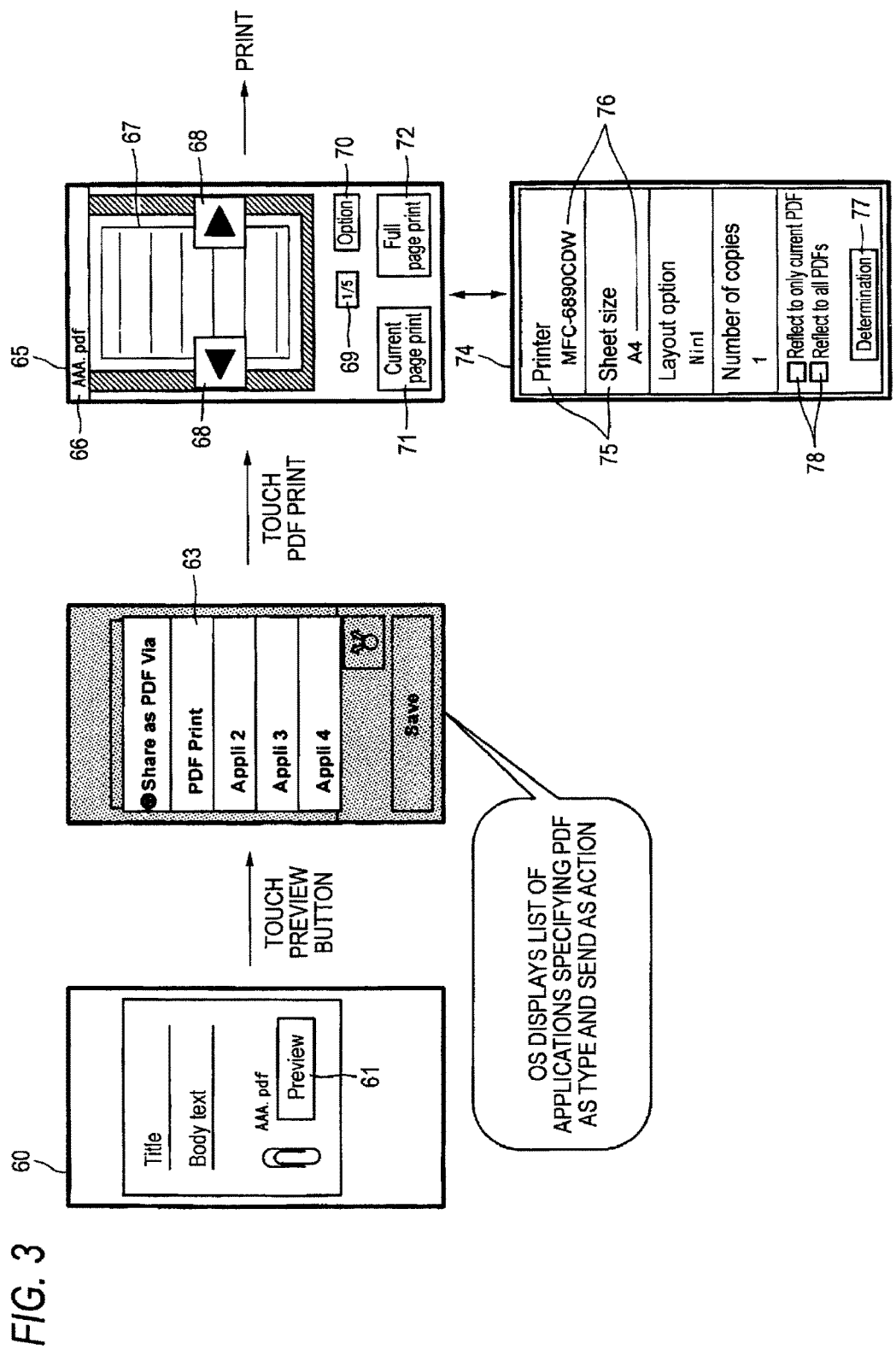

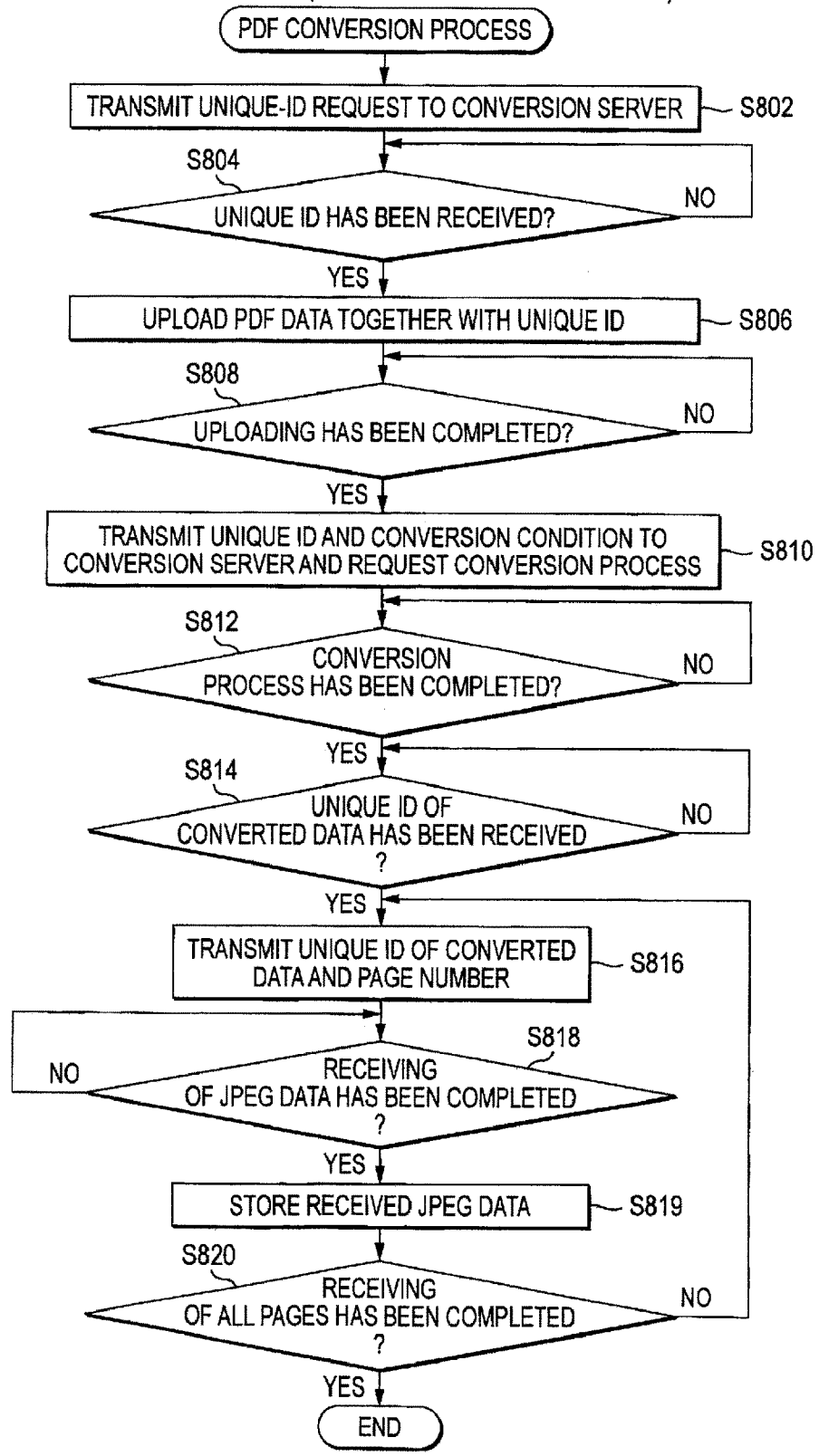
FIG. 8  FIRST EMBODIMENT (PROCESS IN PORTABLE TERMINAL)

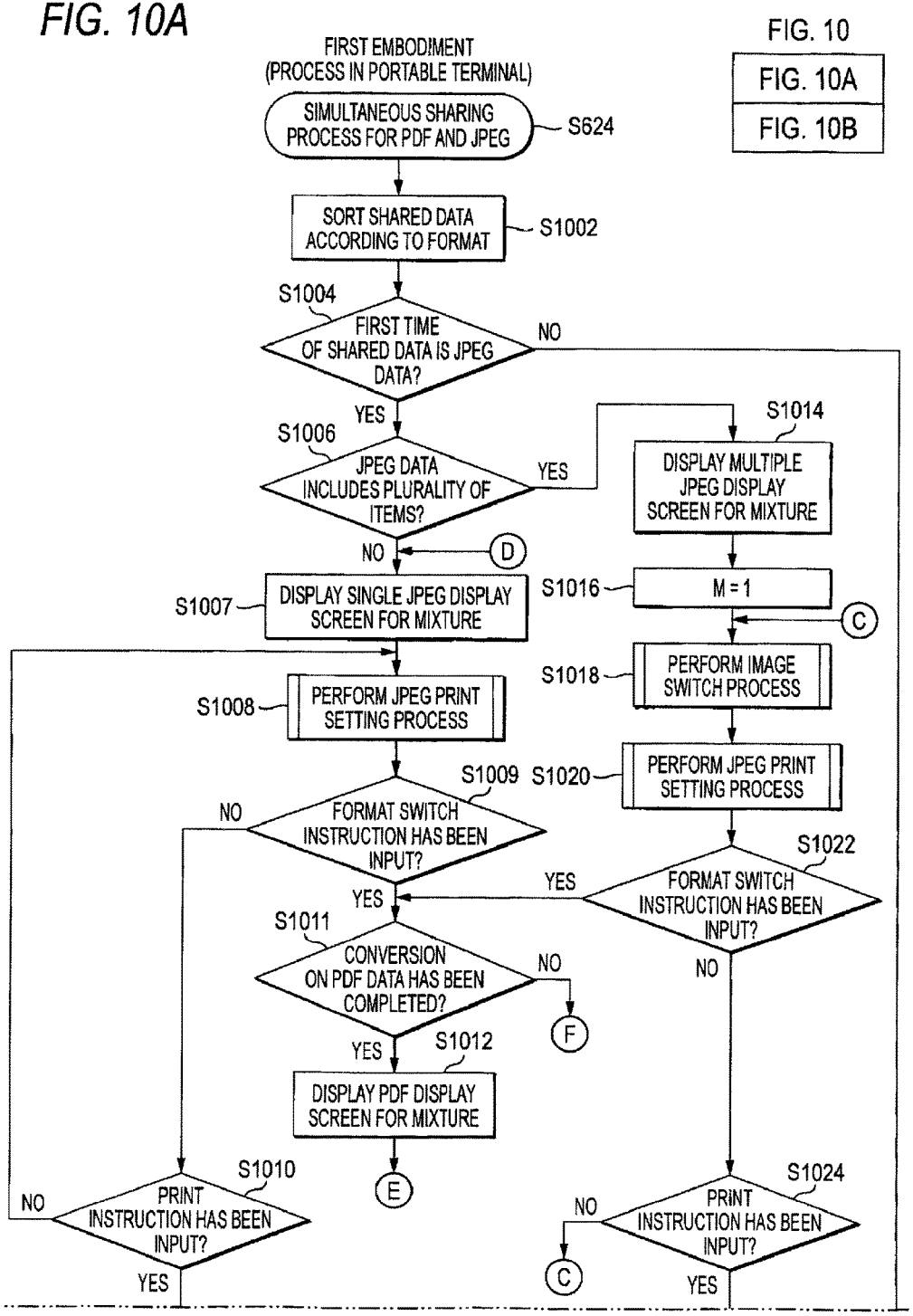

COMPUTER READABLE RECORDING MEDIUM, INFORMATION PROCESSING APPARATUS, AND INFORMATION PROCESSING METHOD FOR DISPLAYING CONVERTED IMAGE DATA

CROSS-REFERENCE TO RELATED APPLICATION

This application is a continuation of U.S. patent application Ser. No. 13/358,458, filed Jan. 25, 2012, which further claims the benefit of priority of Japanese Patent Application No. 2011-068995 filed on Mar. 25, 2011, the contents of both of which are incorporated herein by reference in their entirety.

BACKGROUND

The present disclosure relates to a computer readable recording medium storing an information processing program, an information processing apparatus, and an information processing method.

There has been known an apparatus which displays a preview screen including a print image of a file selected by a user, a print option button, and a print button, and prints the file of the print image if receiving an input by the print button on the preview screen.

SUMMARY

Here, in a case where a file name that the user knows is changed for the reasons of an internal process of the apparatus, if the changed file name is displayed on the preview screen, the user does not know the changed file name displayed on the preview screen, the user may be given a feel of strangeness.

One of aspects of the present disclosure was made considering the above-motioned problem, and an object of the aspect of the present disclosure is to provide an information processing program, an information processing apparatus, and an information processing method which make a user to visibly recognize a data name of data which is a source of a display image such that it is difficult that the user is given a feeling of strangeness.

The aspect of the present disclosure provides the following arrangements:

An information processing apparatus comprising:

a transmitting unit configured to transmit first-kind data which data having a first format designated as target data;

a second-kind-data storing unit configured to store second-kind data in association with a first data name of the first-kind data transmitted by the transmitting unit, the second-kind data being data being generated in a second format by converting the first-kind data transmitted by the transmitting means, and being received from an external apparatus; and a display unit configured to display a display image generated using the second-kind data stored by the second-data storing unit, together with the first data name associated with the second-kind data.

A non-transitory computer readable recording medium storing an information processing program to be executed by a computer of an information processing system including a transmitting unit, a storing unit and a display unit, the information processing program comprising:

a transmission control instruction that causes the transmitting unit to transmit first-kind data which is data having a first format designated as target data;

a second-kind-data-storage control instruction that causes the storing unit to store second-kind data in association with a first data name of the first-kind data transmitted by the transmitting unit, the second-kind data being generated in a second format by converting the first-kind data transmitted by the transmitting unit, and being received from an external apparatus; and a first display control instruction that causes the display unit to display a display image generated using the second-kind data stored by the second-kind-data storing unit, together with the first data name associated with the second-kind data.

An information processing method which is performed in an information processing apparatus, comprising:

transmitting first-kind data which data having a first format designated as target data;

storing second-kind data in association with a first data name of the transmitted first-kind data, the second-kind data being data generated in a second format by converting the transmitted first-kind data, and being received from an external apparatus; and displaying a display image generated using the stored second-kind data, together with the first data name associated with the second-kind data.

BRIEF DESCRIPTION OF DRAWINGS

FIG. 3 is a view illustrating screen transition on an LCD of the portable terminal.

FIG. 7A shows a PDF display process, FIG. 7B is a preparation process, and FIG. 7C shows a PDF-manipulation receiving process.

FIG. 8 is a flow chart illustrating a PDF conversion process that is performed in the portable terminal.

FIG. 9A shows a JPEG display process, FIG. 9B is a JPEG print setting process, and FIG. 9C shows an image switch process.

FIGS. 10A and 10B are a flow chart illustrating a simultaneous sharing process for PDF and JPEG that is performed in the portable terminal.

DESCRIPTION OF EXEMPLARY EMBODIMENTS

Figure 1:
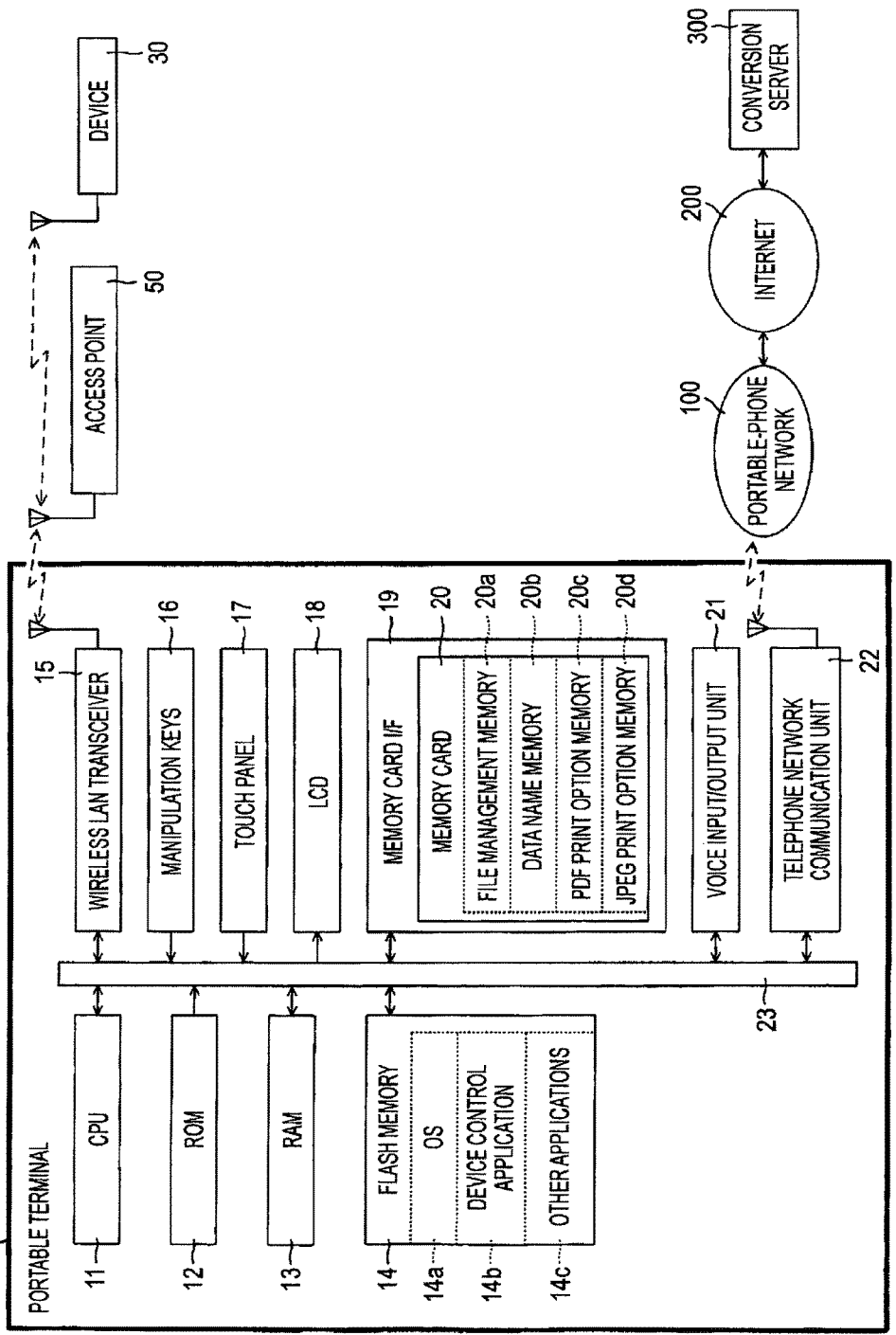
FIG. 1 is a block diagram illustrating an electrical configuration of a portable terminal including a device control application according to an exemplary embodiment.

Hereinafter, an exemplary embodiment will be described with reference to the accompanying drawings. FIG. 1 is a block diagram illustrating an electrical configuration of a portable terminal 10 having a device control application 14b (hereinafter, referred to as the present application 14b) according to an exemplary embodiment. The present application 14b is an application for enabling a user to use a printing function of a device 30 directly from the portable terminal 10, without passing through a personal computer or the like. The portable terminal 10 executes the present application 14b to transmit data having a PDF format (hereinafter, referred to as PDF data) to a conversion server 300, makes the conversion server 300 convert the PDF data into data having a JPEG format (hereinafter, referred to as JPEG data), and makes a liquid crystal display 18 (hereinafter, referred to as an LCD 18) display preview images or instructs for the device 30 to perform printing, on the basis of the JPEG data. Particularly, when making the LCD 18 display the preview images generated on the basis of the JPEG data, the present application 14b makes the LCD 18 display the preview images together with a data name of the PDF data that is the source of the JPEG data, so as not to give the user a feeling of strangeness.

The portable terminal 10 is a portable phone that can make a voice call with another device or use the Internet 200, through a portable-phone network 100. The portable terminal 10 includes a CPU 11, a ROM 12, a RAM 13, a flash memory 14, a wireless LAN transceiver 15, manipulation keys 16, a touch panel 17, an LCD 18, a memory card interface 19 (hereinafter, referred to as a memory card I/F 19), a voice input/output unit 21, and a telephone network communication unit 22. These components are connected to one another through bus lines 23.

The CPU 11 controls individual units connected to the bus lines 23, in accordance with fixed values, programs, and the like stored in the ROM 12 or the like. The ROM 12 is a non-volatile memory incapable of rewriting, and the RAM 13 is a volatile memory capable of rewriting. The flash memory 14 is a rewritable non-volatile memory, and stores an operating system 14a (hereinafter, referred to as an OS 14a), the present application 14b, and the other applications 14c. The OS 14a is basic software for implementing standard functions of the portable terminal 10, and is an Android (registered trademark) OS in the present embodiment.

The present application 14b is a program for outputting a print instruction from the portable terminal 10 to the device 30. For example, the other applications 14c include a browser, an E-mail application, a camera application, or the like installed in the portable terminal 10. Hereinafter, the present application 14b and the other applications 14c are referred to collectively as "applications". Hereinafter, the CPU 11 which executes a program such as an application or the operating system may be referred to simply as the name of the program. For example, a term 'application' may mean 'the CPU 11 that executes an application'.

Each application calls an API of the OS 14a, and outputs data for each component of the portable terminal 10, such as the wireless LAN transceiver 15, the manipulation keys 16, the touch panel 17, the LCD 18, the memory card I/F 19, the voice input/output unit 21, and the telephone network communication unit 22, to the OS 14a. In other words, each application controls each component of the portable terminal 10 by calling the API of the OS 14a. Further, each application calls the API of the OS 14a, and acquires data output from each component of the portable terminal 10, and data representing a status of each component, from the OS 14a. That is, each application acquires data representing a status of each component of the portable terminal 10 (including a status of manipulation input to the portable terminal 10), from the OS 14a, by calling the API of the OS 14a. The OS 14a may notify the data which each component of the portable terminal 10 outputs, and the data representing the status of each component, to each application, regularly or whenever the status of each component changes. In other words, each application acquires the data representing the status of each component of the portable terminal 10 (including the status of the manipulation input to the portable terminal 10), from the OS 14a, by receiving the notification from the OS 14a.

The wireless LAN transceiver 15 is a circuit for wirelessly connecting the portable terminal 10 and the device 30 in an infrastructure mode through an access point 50 by a wireless LAN based on IEEE 802.11bg standards. The manipulation keys 16 are hard keys provided to a housing of the portable terminal 10. The touch panel 17 is provided to overlap the LCD 18, and inputs option information and instructions to the portable terminal 10. The LCD 18 displays various screens such as the PDF display screen (to be described with reference to FIGS. 3 and 4A to 4C). The memory card I/F 19 is an interface for installing a non-volatile memory card 20, and controls writing of data to the memory card 20 or reading of data from the memory card 20.

The memory card 20 may be an SD card (registered trademark). In the present embodiment, the memory card 20 includes a file management memory 20a, a data name memory 20b, a PDF print option memory 20c, and a JPEG print option memory 20d. In the file management memory 20a, for example, data downloaded from the Internet 200 or the like is stored. In the data name memory 20b, a data name of PDF data designated as target data for a print process from among PDF data stored in the file management memory 20a is stored. In the PDF print option memory 20c, option values for printing to be applied for printing PDF data is stored, and in the JPEG print option memory 20d, option values for printing to be applied for printing JPEG data is stored.

The voice input/output unit 21 is a device for voice input and output that includes a microphone, a speaker, and so on, and the telephone network communication unit 22 is a circuit for performing communication through the portable-phone network 100. The portable-phone network 100 is a communication network based on international mobile telecommunication-2000 (IMT-2000), and is connected to the Internet 200 through a gateway (not shown) so as to enable use of the Internet 200 through the portable terminal 10. The conversion server 300 provides a service for converting PDF data received from the portable terminal 10 into JPEG data, and returning the JPEG data to the portable terminal 10.

The device 30 includes a wireless LAN transceiver (not shown) having the same configuration as that of the wireless LAN transceiver 15 of the portable terminal 10, and makes a Wi-Fi connection with the portable terminal 10 by a wireless communication through the access point 50. Further, the device 30 prints images on the basis of JPEG data received from the portable terminal 10.

Figure 2A:
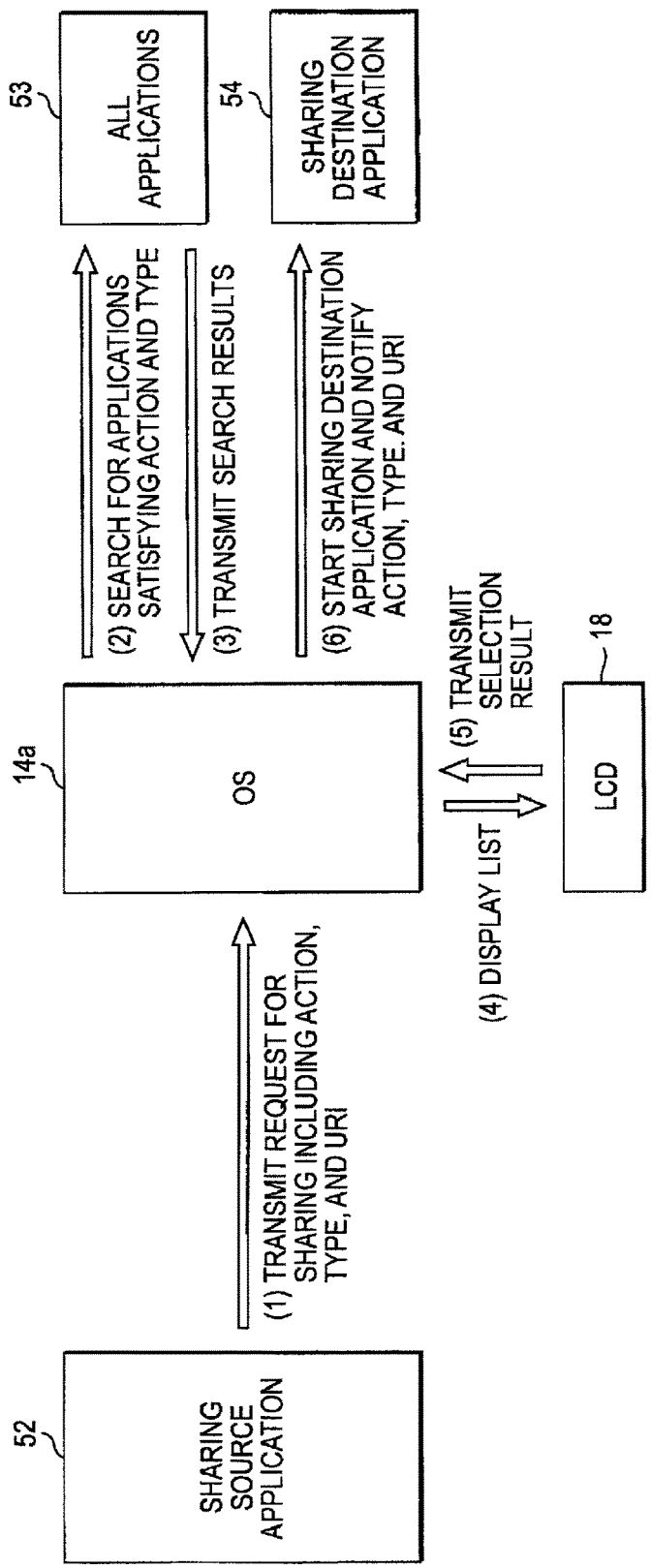
FIG. 2A is a view schematically illustrating a sharing function.

FIG. 2A is a view schematically illustrating a sharing function that is implemented by using the API of the OS 14a of the portable terminal 10. The sharing function is a function of performing data transmission and reception between the applications. Hereinafter, data transmitted and received between the applications is referred to as shared data.

As shown in FIG. 2A, in the sharing function, one running application (hereinafter, referred to as a sharing source application 52) calls an API of the OS 14a and requests performing of the sharing function (see (1) of FIG. 2A). This request includes a uniform resource identifier (URI) of shared data, a type representing the format of the shared data, and an action representing a process to be performed on the shared data. The URI is information representing the location of the shared data, and is composed of a file path.

Meanwhile, each of all applications 53 includes a manifest file for specifying a type representing data formats capable of being processed in the corresponding application, and an action representing a kind of an executable process. Therefore, the OS 14a searches all applications 53 installed in the portable terminal 10 for applications satisfying search criteria which are the type and the action notified from the sharing source application 52 (see (2) of FIG. 2A), and acquires identification information of the searched applications (see (3) of FIG. 2A).

Next, the OS 14a makes the LCD 18 display a list of the extracted applications (see (4) of FIG. 2A). Then, if the user selects any one of the list as a sharing destination application 54 (see (5) of FIG. 2A), the OS 14a starts the sharing destination application 54, sets a screen of the sharing destination application 54 in the foreground (foreside), and notifies the URI, the type, and the action notified from the sharing source application 52 (see (6) of FIG. 2A). As a result, the sharing destination application 54 selected by the user accesses shared data specified by the notified URI and performs a process according to the value of the action.

Figure 2B:
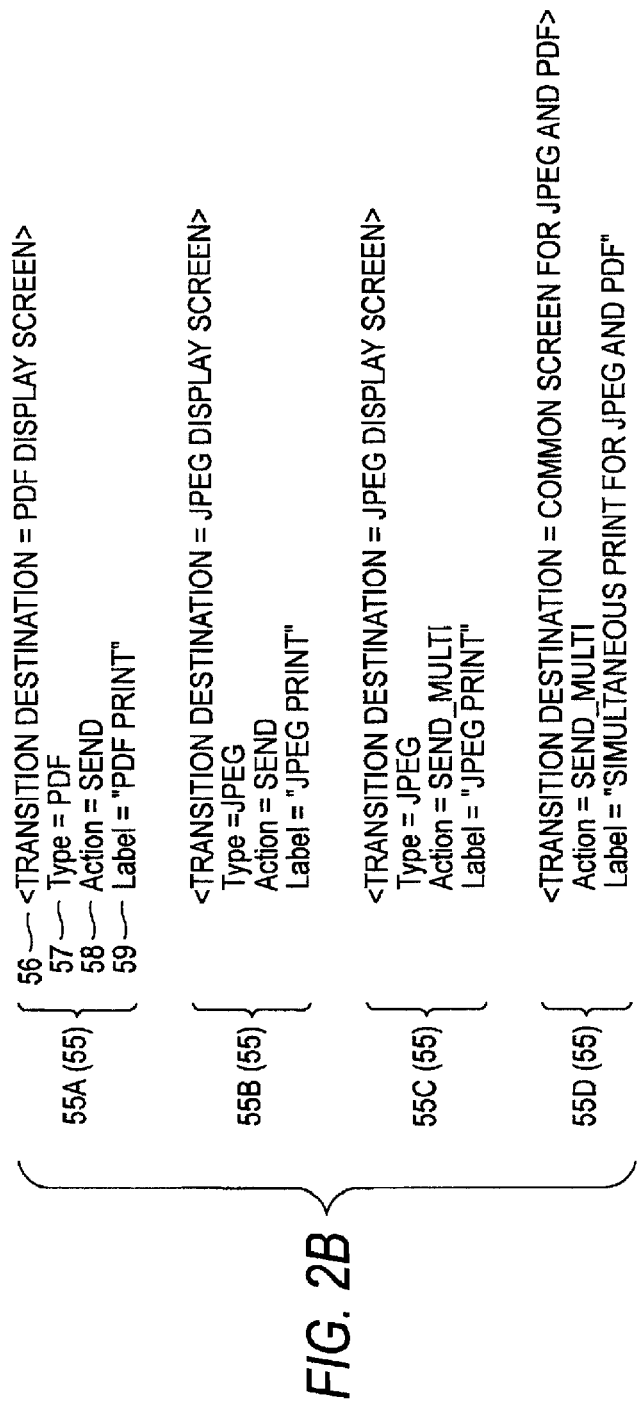
FIG. 2B is a view illustrating an example of the contents of a manifest file.

FIG. 2B is a view illustrating an example of the contents of the manifest file of the present application 14b. As shown in FIG. 2B, the manifest file of the present application 14b includes four kinds of manifests 55, and each of the manifests 55 includes a transition destination 56, a type 57, an action 58, and a label 59. The transition destination 56 is information that designates a screen which the present application 14b will display in the foreground when being selected as the sharing destination application 54. The label 59 is information that designates the name of the present application 14b which should be displayed in a list of applications.

A first manifest 55A is a manifest corresponding to a PDF print function, and designates a PDF as the type 57. Therefore, in a case where PDF data is designated as the shared data, the present application 14b is displayed the list of applications on the basis of the first manifest 55A. A second manifest 55B is a manifest corresponding to a JPEG print function. Therefore, in a case where JPEG data is designated as the shared data, the present application 14b is displayed in the list of applications on the basis of the second manifest 55B.

A third manifest 55C is a manifest corresponding to the JPEG print function, designates a JPEG format as the type 57, and designates SEND MULTI as the action 58. Since SEND MULTI is an action representing a function of transmitting data including a plurality of items, in a case where the shared data includes a plurality of items, it is highly likely that the sharing source application 52 designates SEND MULTI as the action 58. Therefore, in a case where JPEG data of a plurality of items is designated as the shared data, the present application 14b is displayed in the list of applications, on the basis of the third manifest 55C.

A fourth manifest 55D is a manifest corresponding to the PDF print function and the JPEG print function, and does not include the type 57. The fourth manifest 55D designates SEND MULTI as the action 58. Therefore, in a case where the type of the shared data is not designated, the present application 14b is displayed in the list of applications, on the basis of the fourth manifest 55D.

FIG. 3 is a view illustrating a screen transition example in a case where the E-mail application that is one of the other applications 14c is set as the sharing source application 52, and the present application 14b is set as the sharing destination application 54. First, in a reception mail screen 60 of the E-mail application, in a case where the user touches a preview button 61 in the reception mail screen 60, the E-mail application requests performing of the sharing function. It is assumed for deception that the request includes an URI designating an attachment file of the reception mail as the shared data, and a type designating the PDF, and an action designating SEND.

Meanwhile, the OS 14a extracts candidates for the sharing destination application 54 by using the type and the action as the search criteria, and displays a list 63 of extracted applications in the foreground. In this case, the present application 14b extracts the candidates for the sharing destination application 54, on the basis of the type of the first manifest 55A (FIG. 2B). Further, on the basis of the label 59 of the first manifest 55A, the name of the present application 14b is displayed as 'PDF Print' in the list 63 of applications. Here, in a case where the user selects 'PDF Print', that is, the present application 14b as the sharing destination application 54 for printing the attachment file, a PDF display screen 65 of the present application 14b is displayed in the foreground.

The PDF display screen 65 includes a data name 66, a PDF preview image 67, page switch buttons 68, and page number information 69, an option button 70, a current page print button 71, and a full page print button 72. The data name 66 is the data name of PDF data designated as the shared data.

The PDF preview image 67 is an image corresponding to data of one page included in the PDF data; however, it is actually an image generated from JPEG data. As will be described below in detail, the present application 14b is configured to display the data name 66 of the PDF data together with the PDF preview image 67 generated from the JPEG data, so as not to give the user a feeling of strangeness.

As shown in FIG. 3, it is preferable to include an extension (.pdf) representing that the shared data has the PDF, in the data name 66. In this case, it is possible to make the PDF preview image 67 look as it has been displayed on the basis of the PDF data, such that it is difficult to give the user a feeling of strangeness.

In a case where target data for the print process is PDF data, the present application 14b makes a rimmed print be performed such that a margin is provided to an edge of an image. Therefore, as shown in FIG. 3, it is preferable to generate a PDF preview image 67 with the margin from JPEG data, and display the PDF preview image 67 on the LCD 18.

The page switch buttons 68 are objects for receiving an instruction for a switch to a PDF preview image 67 to be displayed. Here, the PDF format is a format capable of storing data of a plurality of pages as one data unit. Meanwhile, the JPEG format is a format capable of storing data of one page as one data unit. Actually, PDF preview images 67 generated on the basis of JPEG data are displayed. However, it is possible to display the page switch buttons 68 and sequentially switch PDF preview images 67 to be displayed, in the page order, such that the user feels as if the user is browsing data of a plurality of pages, and operability is good.

The page number information 69 includes a page number of a currently displayed PDF preview image 67, and the total number of pages included in the PDF data. In a case where the PDF data stores data of one page, "1/1" is displayed in the page number information 69. Therefore, it is possible to make the user easily understand the structure of the PDF data. For example, the user can easily recognize whether another page is included in the PDF data which is the source of the currently displayed PDF preview image 67.

The option button 70 is an object for receiving a change in value of options for print. It the option button 70 is touched, the present application 14*b* makes the display in the foreground transition from the PDF display screen 65 to a PDF print option screen 74.

The PDF print option screen 74 is a screen for receiving setting for print, and includes various options 75 for print, option values 76, and a determination button 77. In a case where any one of the option 75 is touched, the present application 14*b* displays the candidates for a option value 76 settable for the corresponding option 75, so as to enable the user to select any one candidate.

The PDF print option screen 74 further includes the determination button 77 and check boxes 78. The check boxes 78 are objects for enabling the user to select the application range of the option values 76. In a state in which there is a check mark in a check box 78 on whether to reflect to only the current PDF, if the user touches the determination button 77, the present application 14*b* stores the option values 76 in the PDF print option memory 20*c* in association with the data name of the JPEG data used for generating the currently displayed PDF preview image 67, and the data names of JPEG data derived from the same PDF data as that for the JPEG data used for generating the currently displayed PDF preview image 67, and displays the PDF display screen 65. Meanwhile, in a state in which there is a check mark in a check box 78 on whether to reflect to all PDFs, if the user touches the determination button 77, the present application 14*b* stores the option values 76 to the PDF print option memory 20*c*, without associating the option values 76 with a specific JPEG data, and displays the PDF display screen 65.

The current page print button 71 and the full page print button 72 are objects for receiving print instructions. In a case where a print instruction is received by the current page print button 71, the present application 14*b* determines the JPEG data used for generating the currently displayed PDF preview image 67 as the print target, and instructs the device 30 to print the JPEG data. Meanwhile, in a case where an print instruction is received by the full page print button 72, the present application 14*b* determines all of the JPEG data used for generating the currently displayed PDF preview image 67 and the JPEG data derived from the same PDF data as that for the JPEG data used for generating the currently displayed PDF preview image 67, as the print target, and instructs the device 30 to print the JPEG data.

Figure 4C:
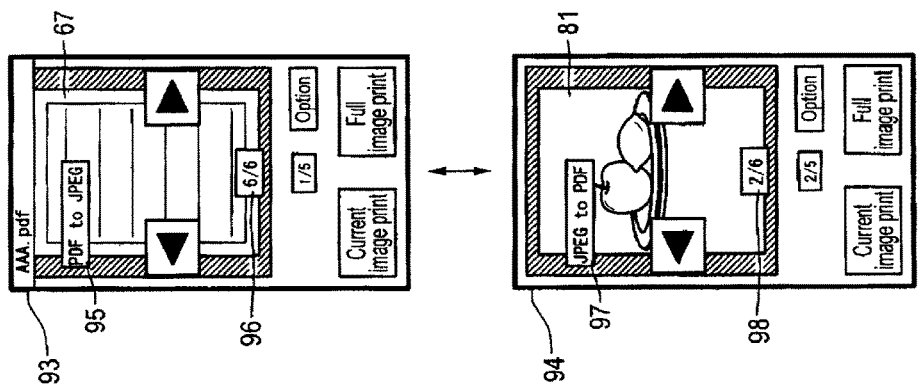
FIGS. 4A to 4C are views illustrating screens that are displayed on the LCD of the portable terminal.
Figure 4B:
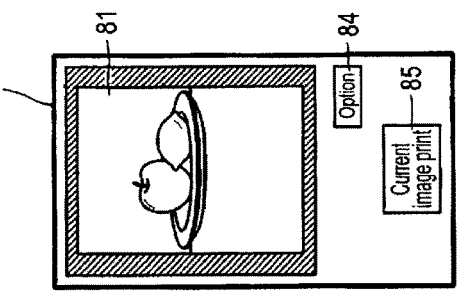
Figure 4A:
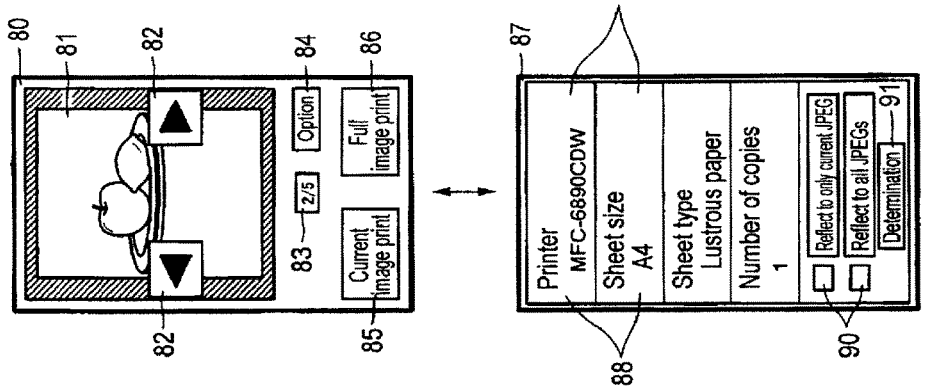

FIG. 4A is a view illustrating an example of a multiple JPEG display screen 80 of the present application 14*b*. This screen is displayed in a case where JPEG data of a plurality of items is designated as the shared data and the present application 14*b* is selected as the sharing destination application 54.

The multiple JPEG display screen 80 is configured to include a JPEG preview image 81, image switch buttons 82, image number information 83, an option button 84, a current image print button 85, and a full image print button 86. Here, it is often that PDF data includes a document. Therefore, it is highly likely that the user identifies each item of the PDF data on the basis of the data name. Meanwhile, most JPEG data includes a thumbnail (a reduced image that is displayed as an icon) in advance. Therefore, it is highly likely that the user identifies each item of JPEG data on the basis of the thumbnail rather than the data name. Therefore, in a case of the JPEG data, there is less need to make the user visibly recognize the data name, as compared to the PDF data. For this reason, unlike the PDF display screen 65, any data name is not displayed on the multiple JPEG display screen 80.

The JPEG preview image 81 is an image generated from the JPEG data designated as the shared data. In a case of making the device 30 print the JPEG data, the present application 14*b* makes an inkjet printer perform a rimless print, and makes a laser printer perform a rimmed print. Therefore, in a case where the device 30 which is a print instruction subject is an inkjet printer, it is preferable to display the JPEG preview image 81 with no margin, as shown in FIG. 4A. Meanwhile, in a case where the device 30 which is a print instruction subject is a laser printer, it is preferable to display the JPEG preview image 81 with a margin.

The image switch buttons 82 are objects for receiving an instruction for a switch to a JPEG preview image 81 to be displayed. In a case where the image switch buttons 82 are touched, the present application 14*b* sequentially switches JPEG preview images 81 to be displayed.

The image number information 83 includes an image number of the currently displayed PDF preview image 67, and a total number of data items included the JPEG data designated as the shared data.

In the multiple JPEG display screen 80, in a case where the option button 84 is touched, the present application 14*b* makes the display in the foreground transition from the multiple JPEG display screen 80 to a JPEG print option screen 87.

The JPEG print option screen 87 is a screen for receiving setting for print, like the PDF print option screen 74, and includes various options 88 for print, and option values 89 for the options 88.

Here, the JPEG print option screen 87 includes the options 88 different from those of the PDF print option screen 74 (FIG. 3). In other words, option items displayed in a case of making the option screen be displayed when the multiple JPEG display screen 80 has been displayed are different from those displayed in a case of making the option screen be displayed when the PDF display screen 65 has been displayed.

For example, in a case where each image corresponding to the JPEG data is a photo image, selection of a sheet type is an important option. In general, in a case where a high-quality print of each photo image is desired by the user, a gloss sheet is selected as the sheet type, and in a case where a high-quality print of each photo image is not desired, a plain sheet is selected as the sheet type. According to the JPEG print option screen 87 shown in FIG. 4A, the sheet type is included as an option 88, unlike in the PDF print option screen 74. Therefore, the user can easily perform setting of the sheet type. Therefore, it is possible to make the user visibly recognize appropriate options according to each image which is the print target, and operability when the setting for print is performed is good.

The JPEG print option screen 87 further includes check boxes 90 and a determination button 91. The check boxes 90 are objects for enabling the user to select the application range of the option values 89. In a state in which there is a check mark in a check box 90 on whether to reflect to only the current JPEG, if the user touches the determination button 91, the present application 14*b* stores the option values 89 in the JPEG print option memory 20*d* in association with the data name of currently displayed JPEG data, and displays the multiple JPEG display screen 80. Meanwhile, in a state in which there is a check mark in a check box on whether to reflect to all JPEGs, if the user touches the determination button 91, the present application 14*b* stores the option values 89 to the JPEG print option memory 20*d*, without associating the option values 89 with specific JPEG data, and displays the multiple JPEG display screen 80.

The current image print button 85 and the full image print button 86 are objects for receiving print instructions. In a case where a print instruction is received by the current image print button 85, the present application 14*b* instructs the device 30 to print the currently displayed JPEG data. Meanwhile, in a case where a print instruction is received by the full image print button 86, the present application 14*b* instructs the device 30 to print all of the JPEG data designated as the shared data.

FIG. 4B is a view illustrating an example of a single JPEG display screen 92 of the present application 14*b* which the OS 14*a* displays in the foreground of the LCD 18 in a case where JPEG data of a single item is designated as the shared data and the present application 14*b* is selected as the sharing destination application 54. As shown in FIG. 4B, the single JPEG display screen 92 is the same as the multiple JPEG display screen 80 except that the image switch buttons 82, the image number information 83, and the full image print button 86 are not included. As described above, appropriate screens are used according to whether the number of items of JPEG data designated as the shared data is 1 or more. Therefore, the user can recognize whether the number of items of JPEG data designated as the shared data is 1 or more, at a glance, and thus convenience is good. Further, since various buttons are displayed within the minimum necessary level, it is possible to improve visibility of preview images.

FIG. 4C is a view illustrating examples of a PDF display screen 93 for a mixture and a multiple JPEG display screen 94 for a mixture that are displayed in a case where PDF data and JPEG data are designated as the shared data. The PDF display screen 93 for a mixture shown in FIG. 4C is different from the PDF display screen 65 shown in FIG. 3 in that a format switch button 95 and data-item-number information 96 are included. Similarly, the multiple JPEG display screen 94 for a mixture shown in FIG. 4C is different from the multiple JPEG display screen 80 shown in FIG. 4A in that a format switch button 97 and data-item-number information 98 are included.

The format switch buttons 95 and 97 are objects for receiving instructions for switching the types of images to be displayed. In a case where an instruction for switching the type of an image to be displayed by the format switch button 95 or 97, the present application 14*b* switches the display on the LCD 18 from a current display screen of the PDF display screen 93 for a mixture and the multiple JPEG display screen 94 for a mixture to the other screen.

The data-item-number information 96 or 98 is information representing the total number of items of the data designated as the shared data, and information representing what number item of the data designated as the shared data the shared data corresponding to the currently displayed preview image corresponds to. The data-item-number information 96 and 98 enables the user to easily recognize how much items other than the item of the shared data corresponding to the currently displayed preview image are in the shared data.

Figure 5:
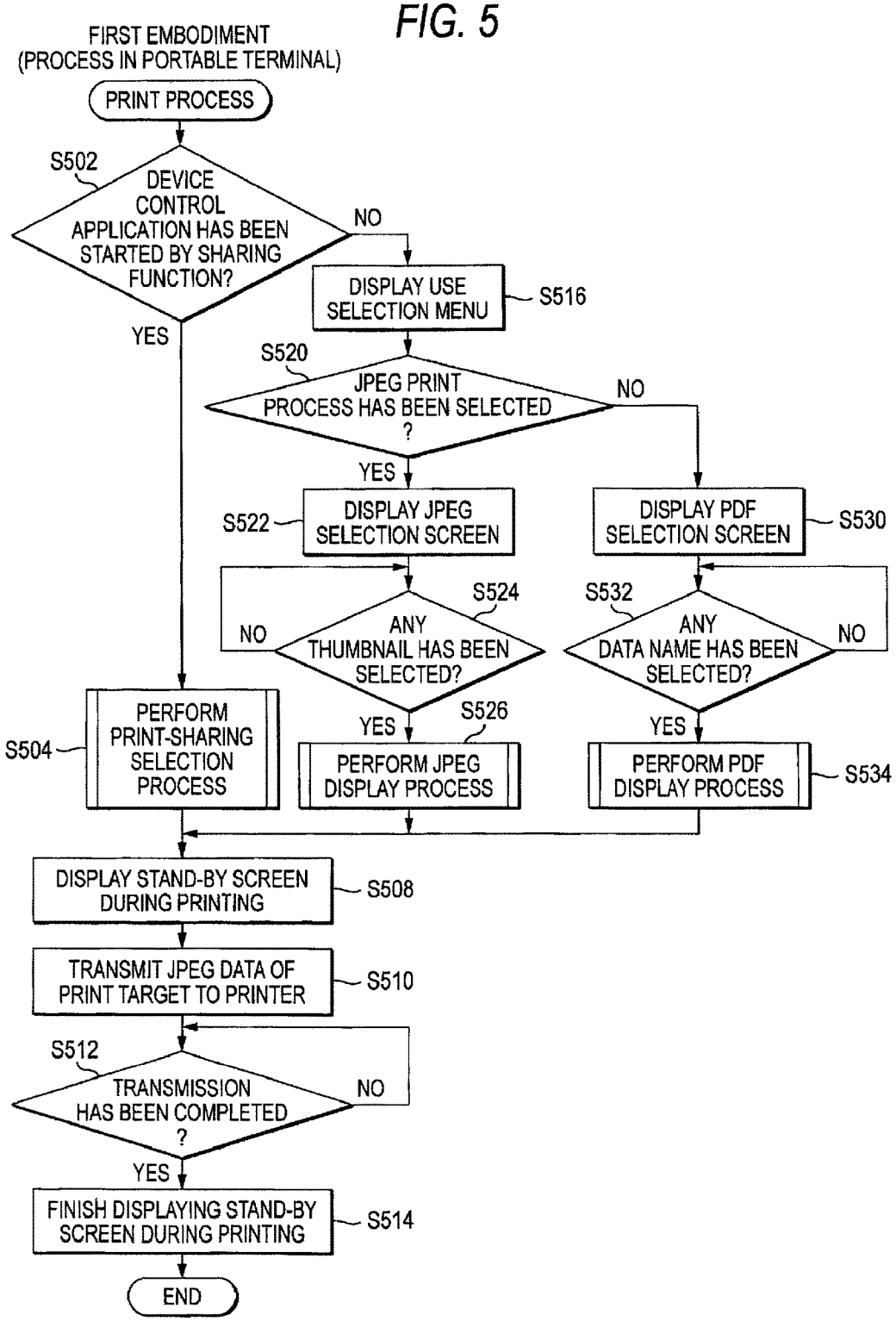
FIG. 5 is a flow chart illustrating a print process that is performed in the portable terminal.

FIG. 5 is a flow chart illustrating a print process that is performed in the portable terminal 10. This process is a process that is started in a case where the present application is started by the OS 14*a*. Each step shown in flow charts of FIGS. 5 to 10 will be described as a step which the present application 14*b* makes the CPU 11 perform with/without using functions of the OS 14*a* or the like. However, some of steps of each flow chart may be changed to steps which the OS 14*a* or other applications make the CPU 11 perform. Alternatively, some of the steps of each flow chart may be changed to steps which are implemented by operation of hardware provided in the portable terminal 10 without involvement of the CPU 11.

If the present application 14*b* is started by the sharing function (Yes in STEP S502), in STEP S504, the CPU 11 performs a print-sharing selection process.

Figure 6:
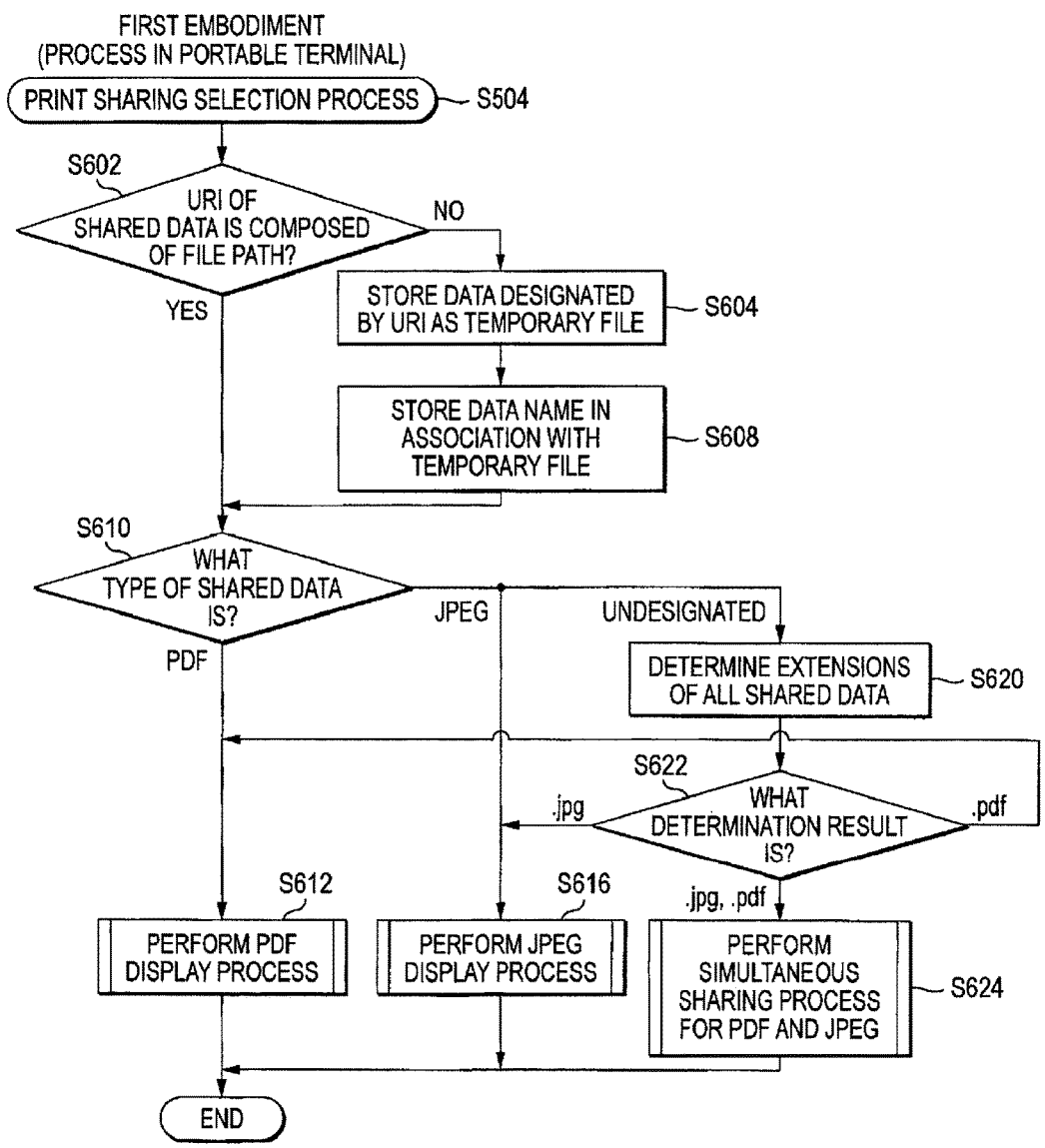
FIG. 6 is a flow chart illustrating a print-sharing selection process that is performed in the portable terminal.

FIG. 6 is a flow chart illustrating the print-sharing selection process. This process is for determining JPEG data to be printed, on the basis of the shared data.

First, in a case where the URI of the shared data notified from the OS 14*a* to the present application 14*b* is composed of a file path (Yes in STEP S602), in STEP S610, the CPU 11 determines the format of the data designated as the shared data by determining the type notified from the OS 14*a*.

In a case where the type notified from the OS 14*a* is the PDF (PDF in STEP S610), that is, a case where it is determined that the format of the shared data is the PDF, in STEP S612, the CPU 11 performs a PDF display process to be described below with reference to FIGS. 7A to 7C. Meanwhile, in a case where the type notified from the OS 14*a* is the JPEG format (JPEG in STEP S610), that is, a case where it is determined that the format of the shared data is JPEG, in STEP S616, the CPU 11 performs a JPEG display process to be described below with reference to FIG. 9A to 9C.

In a case where the OS 14*a* does not notifies the type ('UNDESIGNATED' in STEP S610), in STEP S620, the CPU 11 determines the format of each item of the shared data on the basis of an extension included in the URI of the corresponding item. In a case where all the extensions are '.jpg' (that is, a case where all items of the shared data are JPEG data) ('.jpg' in STEP S622), in STEP S616, the CPU 11 performs the JPEG display process. Meanwhile, in a case where all the extensions are '.pdf' (that is, a case where all items of the shared data are PDF data) ('.pdf' in STEP S622), in STEP S612, the CPU 11 performs the PDF display process. Meanwhile, in a case where it is determined that '.jpg' and '.pdf' are included as the extensions ('.jpg .pdf' in STEP S622), in STEP S624, the CPU 11 performs a simultaneous sharing process for PDF and JPEG to be described below with reference to FIG. 10.

Now, STEP S602 will be described. As formats for designation of the shared data, there are a file format that describes a URI by a file path, and a contents format that describes a URI by an index and ID of an application like 'Contents:///mail/attach/1'. For example, in a case of an E-mail application, in a case of giving an attachment file attached in a reception mail to another application by the sharing function, the attachment file is received in a stream and is temporarily stored in the RAM 13, and a URL in which the location of that data is described in the contents format is notified to the OS 14*a*. In this case, the contents format of URI is notified from the OS 14*a* to the present application 14*b*.

In the case of No in STEP S602, in STEP S604, the CPU 11 stores the shared data designated by the URI, as a temporary file in the memory card 20. In a case where the shared data is PDF data, the shared data is stored as a temporary file having the PDF format, and in a case where the shared data is JPEG data, the shared data is stored as a temporary file having the JPEG format. Next, in STEP S608, the CPU 11 stores a data name in accordance with the temporary file stored in the memory card 20. In a case where the present application 14b is configured to erase the temporary file at a time point when the present application 14b finishes, if a character string '.cache' for showing the user that the shared data is the temporary file is added in the data name, like 'shareAAApdf.cashe', it is possible to further improve the convenience. Next, the CPU 11 performs the process of STEP S610 and the subsequent processes by using the temporary file stored in STEP S604 as the shared data.

Figure 7A:
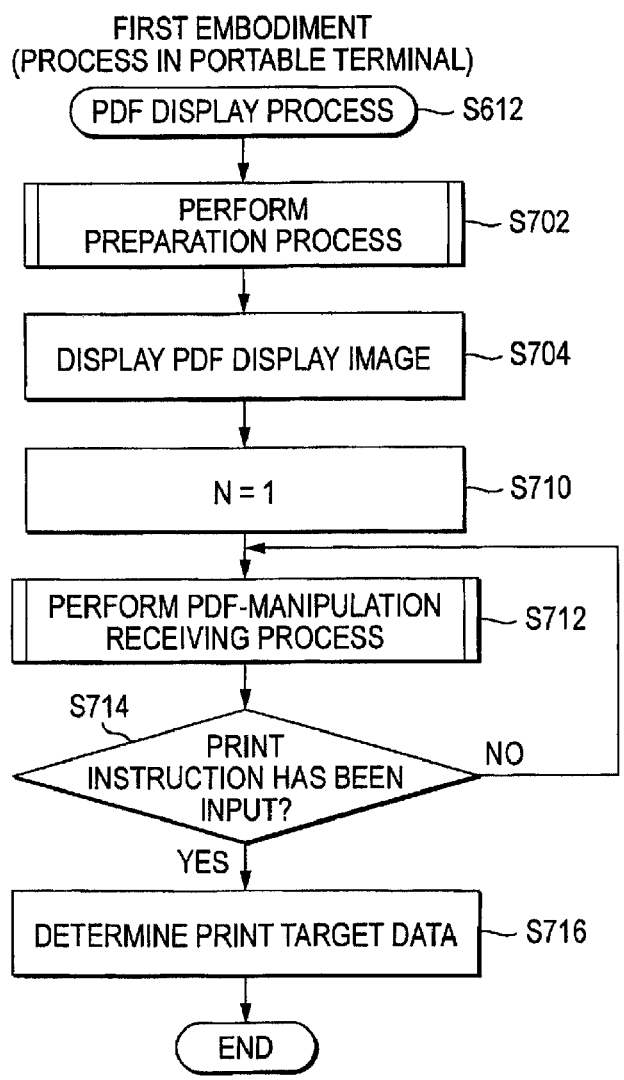
FIG. 7A to 7C are flow charts illustrating processes that are performed in the portable terminal, and more specifically.
Figure 7B:
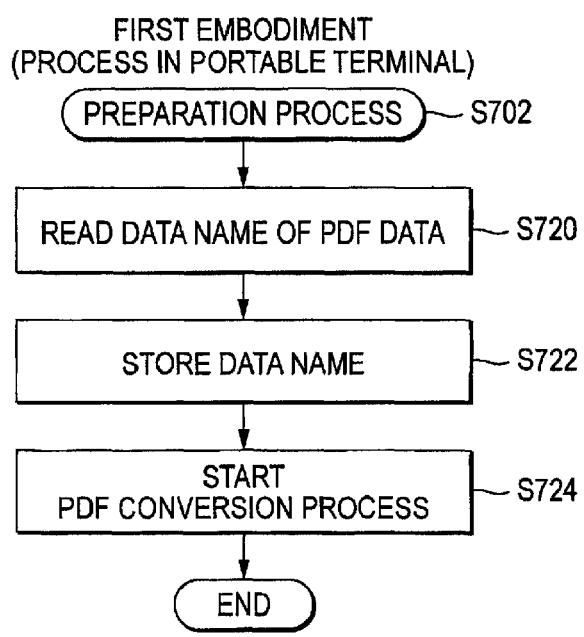

FIG. 7A is a flow chart illustrating the PDF display process of STEP S612. This process is for displaying the PDF display screen 65 on the LCD 18. In the present embodiment, it is assumed for description that the number of items of PDF data, which a target of the PDF display process of STEP S612, is one. In a case where the present application 14b is started by the sharing function, the PDF data of one item designated by the URI of the shared data corresponds to target PDF data.

First, in STEP S702, the CPU 11 performs a preparation process. In the preparation process shown in FIG. 7B, in STEP S720, the CPU 11 reads the data name of the target PDF data from the file management memory 20a, and in STEP S722, the CPU 11 stores the data name in the data name memory 20b. In a case where the URI of the shared data is not designated in the contents format, the CPU 11 reads the data name stored in association with the temporary file, and stores the data name in the data name memory 20b.

Next, in STEP S724, the CPU 11 starts a PDF conversion process. Specifically, the CPU 11 requests the OS 14a to start a sub-thread for performing the PDF conversion process in parallel with the print process, and the PDF conversion process is performed in the sub-thread.

FIG. 8 is a flow chart illustrating the PDF conversion process. This process is for converting PDF data into JPEG data in the conversion server 300. First, in STEP S802, the CPU 11 transmits a unique-ID request from the telephone network communication unit 22 to the conversion server 300. Then, until a unique ID is received (in a case of No in STEP S804), the CPU 11 stands by. Meanwhile, if the unique ID is received (Yes in STEP S804), in STEP S806, the CPU 11 transmits (uploads) the unique ID and the target PDF data from the telephone network communication unit 22 to the conversion server 300 by the telephone network communication unit 22.

Next, until the uploading is completed (in a case of No in step S808), the CPU 11 stands by, and if the uploading is completed (Yes in STEP S808), in STEP S810, the CPU 11 transmits the unique ID and a conversion condition from the telephone network communication unit 22 to the conversion server 300, and requests the conversion server 300 to convert the PDF data designated by the unique ID into JPEG data.

Meanwhile, if receiving the conversion process request, the conversion server 300 generates JPEG data by converting first uploaded PDF data. In a case where the target PDF data for the conversion process includes a plurality of pages, the conversion server 300 generates JPEG data of a plurality of items. Then, in each item of the JPEG data, a page number representing what number page data of the PDF data the corresponding item has been generated from is stored. Then, in a case where the generating of the JPEG data is completed, the conversion server 300 notifies the completion of the conversion process to the portable terminal 10. In the present embodiment, it is assumed that the total number of pages included in the PDF data is included in the conversion process completion notification to be notified to the portable terminal 10.

Meanwhile, until the conversion process completion notification is received (in a case of No in STEP S812), the CPU 11 stands by, and if the conversion process completion notification is received (Yes in STEP S812), the CPU 11 proceeds to STEP S814. Then, until an unique ID of the converted data is received from the conversion server 300 (in a case of No in STEP S814), the CPU 11 stands by, and if the unique ID of the converted data is received (Yes in STEP S814), in STEP S816, the CPU 11 transmits the received unique ID of the converted data and the received page number, from the telephone network communication unit 22 to the conversion server 300. Then, the conversion server 300 transmits JPEG data, corresponding to the page number received from the portable terminal 10, of the converted data (JPEG data) corresponding to the unique ID received from the portable terminal 10, to the portable terminal 10.

Next, until the reception of the JPEG data transmitted from the conversion server 300 is completed (in a case of Yes in STEP S818), the CPU 11 stands by. If the reception of the JPEG data is completed (Yes in STEP S818), in STEP S819, the CPU 11 stores the JPEG data received from the conversion server 300, in the file management memory 20a, in association with the data name of the PDF data that is the source of the received JPEG data, among the data names of the PDF data stored in the data name memory 20b. For example, a management ID assigned to each data name stored in the data name memory 20b is stored in association such that the JPEG data and the data name are associated with each other.

Further, the page number transmitted to the conversion server 300 is stored in association with the JPEG data. For example, if the JPEG data is obtained in response to '001' transmitted as the page number, the page number '001' is included in the data name of the JPEG data and is stored. Therefore, it is possible to store the page number of each page included in the PDF data, in association with JPEG data generated by converting the data of the corresponding page.

Until reception of all pages is completed (in a case of No STEP S820) the CPU 11 repeats the process of STEP S816 and the subsequent processes, thereby transmitting the page number and unique ID of the next page and requesting JPEG data corresponding to the next page from the conversion server 300. Therefore, in a case where the PDF data transmitted to the conversion server 300 includes data items of a plurality of pages, JPEG data of a plurality of items is received from the conversion server 300, and is stored in association with the same data name. While those processes are repeated, if reception of the JPEG data of all pages is completed (Yes in STEP S820), the CPU 11 finishes the PDF conversion process.

Returning to FIG. 7A, in STEP S704, the CPU 11 displays the PDF display screen 65 on the LCD 18. Here, a PDF preview image 67 is generated from the JPEG data corresponding to the first page of the PDF data is generated and is displayed on the LCD 18. Further, the data name associated with the JPEG data (that is, the data name of the PDF data) is displayed. Next, in STEP S710, the CPU 11 sets 1 for a variable N representing a display page, and in STEP S712, the CPU 11 performs a PDF-manipulation receiving process.

Figure 7C:
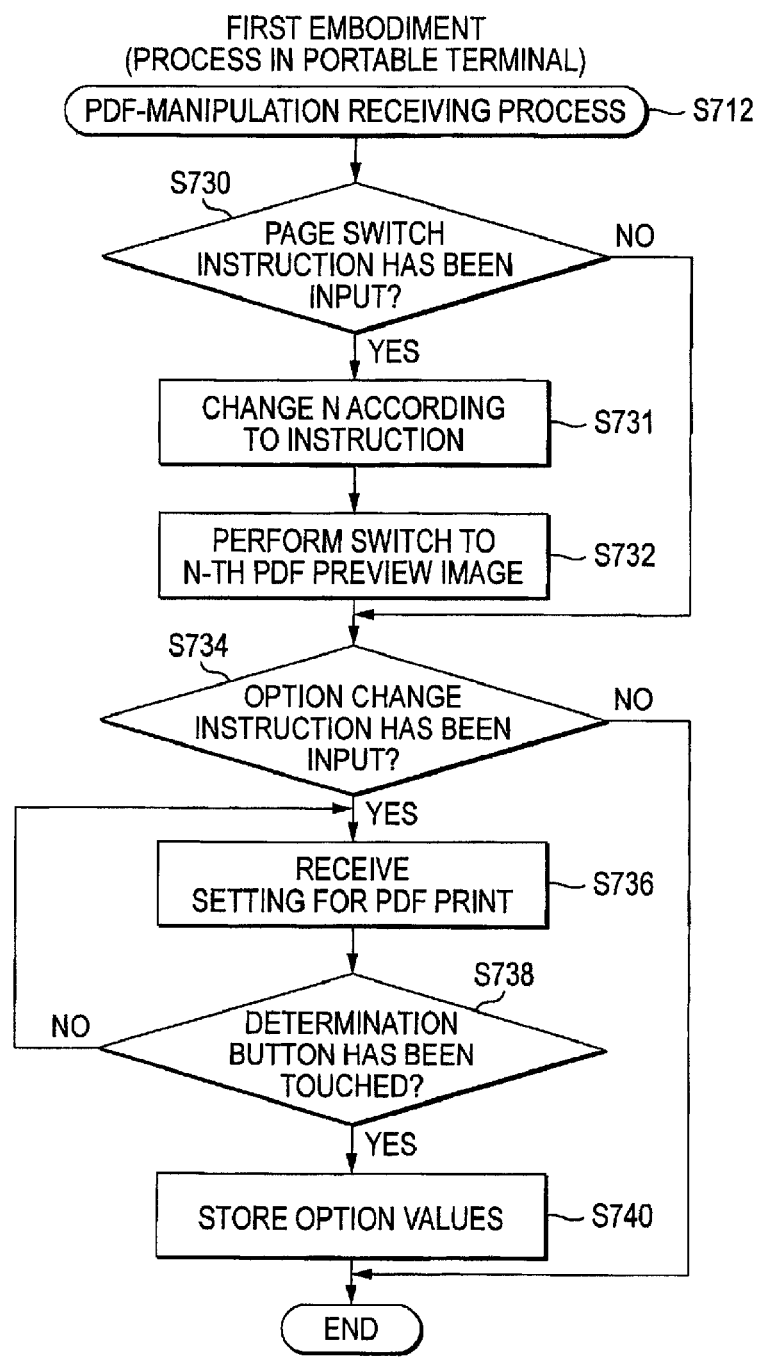

FIG. 7C is a flow chart illustrating the PDF-manipulation receiving process. This process is for receiving a switch instruction for pages to be displayed, and setting of options for print. If the user touches any page switch button 68 to input a page switch instruction (Yes in STEP S730), in STEP S731, the CPU 11 changes N according to the number of times the page switch button 68 is manipulated. Specifically, in a case where the page switch button 68 for instructing transition to the next page is manipulated once, 1 is added to N, and in a case where the page switch button 68 for instructing transition to the previous page is manipulated once, 1 is subtracted from N. Next, in STEP S732, the CPU 11 switches the displayed PDF preview image 67 to a PDF preview image 67 corresponding to the N-th page. Specifically, the CPU 11 uploads the JPEG data associated with the page number N, generates the PDF preview image 67, and displays the PDF preview image 67 on the LCD 18. Meanwhile, in a case where any page switch button 68 is not touched by the user (No in STEP S730), the CPU 11 skips STEP S731 and STEP S732.

Even if the page switch is performed, the data name 66 displayed on the PDF display screen 65 is not changed. This is because, although the PDF data including data of a plurality of pages is converted into JPEG data of a plurality of items, the plurality items of the JPEG data are deviated from the same PDF data and thus are associated with the same data name. As a result, it is possible to make the user feel as if the user is browsing PDF data of one item, and thus it is difficult to give the user a feeling of strangeness.

Next, if the user touches the option button 70 in the PDF display screen 65 to input an option change instruction (Yes in STEP S734), in STEP S736, the CPU 11 displays the PDF print option screen 74 on the LCD 18 and receives setting of options for print.

Next, until the determination button 77 of the PDF print option screen 74 is touched (in a case of No in STEP S738), the CPU 11 repeats the process of STEP S736 and the subsequent processes. If the determination button 77 is touched (Yes in STEP S738), the CPU 11 stores the option values 76 in the PDF print option memory 20c in STEP S740, and finishes the process. As described with reference to FIG. 3, in a state where there is a check mark in the check box 78 on whether to reflect to only the current PDF, if the determination button 77 is touched, the option values 76 are stored in the PDF print option memory 20c, in association with the data name of the JPEG data used for generating the currently displayed PDF preview image 67. Meanwhile, if any option change instruction is not input (No in STEP S734), the CPU 11 finishes the process. When finishing the PDF-manipulation receiving process, the CPU 11 returns the display on the LCD 18 to the previous screen of the PDF print option screen 74.

Returning to FIG. 7A, until a print instruction is input (in a case of No in STEP S714), the CPU 11 repeats the process of STEP S712 and the subsequent processes. If the user touches any one of the current page print button 71 and the full page print button 72 in the PDF display screen 65 to input a print instruction (Yes in STEP S714), in STEP S716, the CPU 11 determines print target data. In a case where the current page print button 71 is touched, the JPEG data used for generating the currently displayed PDF preview image 67 is determined as the print target data. Meanwhile, in a case where the full page print button 72 is touched, all JPEG data derived from the same PDF data as that for the currently displayed PDF preview image 67 is determined as the print target.

Returning to FIG. 5, in STEP S508, the CPU 11 displays a stand-by screen (not shown) during printing, on the LCD 18. Then, the CPU 11 outputs a print instruction from the wireless LAN transceiver 15 to the device 30. Specifically, in STEP S510, the CPU 11 transmits the JPEG data determined as the print target, and the option values, to the device 30 designated by the option values. In a case where there are option values stored in the PDF print option memory 20c in association with the JPEG data of the print target, the option values are applied. Meanwhile, in a case where there are no option values stored in the PDF print option memory 20c in association with the data name of the JPEG data of the print target, the option values that are not associated with specific data are applied.

Then, until the transmission is completed (in a case of No in STEP S512), the CPU 11 stands by, and if the transmission is completed (Yes in STEP S512), the CPU 11 ends the display of the stand-by screen during printing, STEP S514, and finishes the process. Meanwhile, the device 30 prints the JPEG data on the basis of the option values transmitted from the portable terminal 10.

Figure 9A:
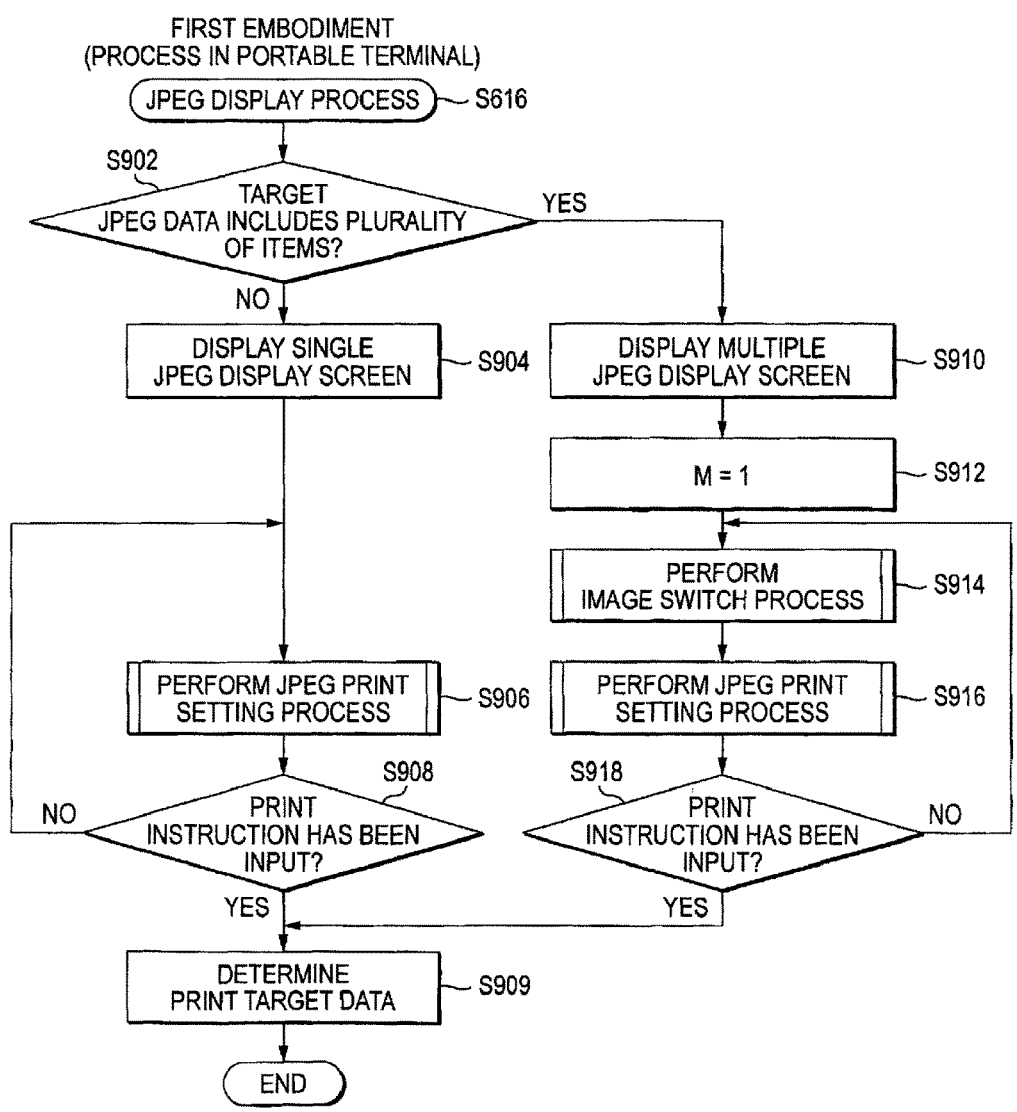
FIG. 9A to 9C are flow charts illustrating processes that are performed in the portable terminal, and more specifically.

FIG. 9A is a flow chart illustrating the JPEG display process. This process is for displaying the JPEG preview image 81. In the present embodiment, it is assumed for description that the number of items of the JPEG data which is the target of the JPEG display process of STEP S616 is 1 or more. In a case where the present application 14b is started by the sharing function, the JPEG data designated by the URI of the shared data corresponds to the target JPEG data.

In a case where the number of items of the target JPEG data is 1 (No in STEP S902), in STEP S904, the CPU 11 displays a single JPEG display screen 92 (FIG. 4B) on the LCD 18, and in STEP S906, the CPU 11 performs a JPEG print setting process.

Figure 9B:
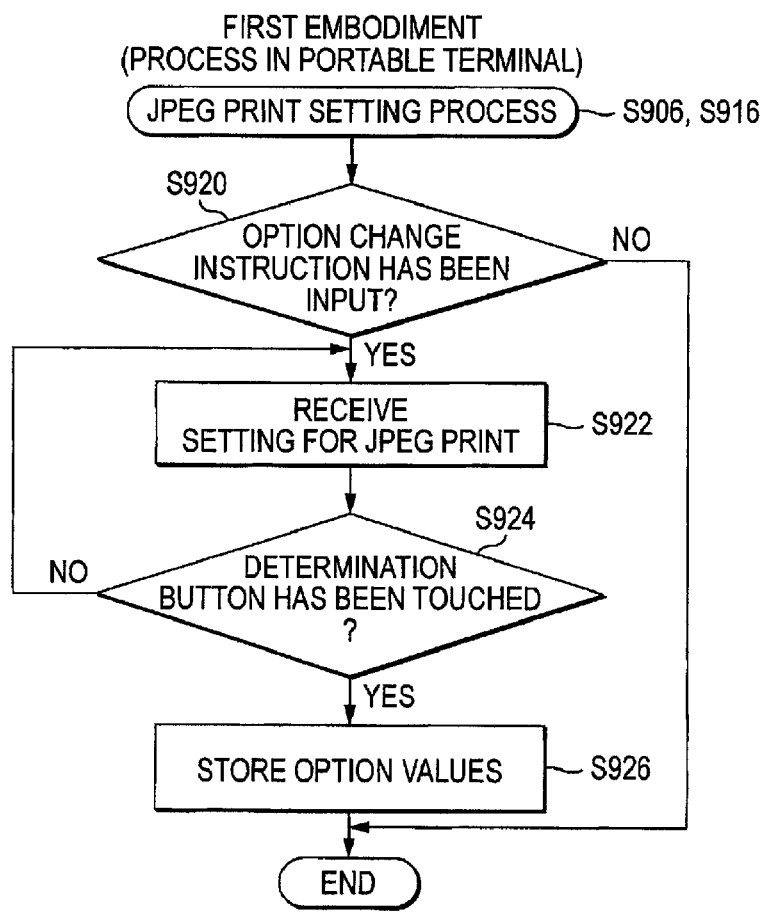

FIG. 9B is a flow chart illustrating the JPEG print setting process. In a case where the user touches the option button 84 to input an option change instruction (Yes in STEP S920) in STEP S922, the CPU 11 displays the JPEG print option screen 87 on the LCD 18, and receives setting for print. Until the determination button 91 of the JPEG print option screen 87 is touched (in a case of No in STEP S902), the CPU 11 repeats the process of STEP S922 and the subsequent processes. If the user touches the determination button 91 (Yes in STEP S924), the CPU 11 stores the option values in the JPEG print option memory 20d in STEP S926, and finishes the process. Even in a case where any option change instruction is not input (No in STEP S920), the CPU 11 finishes the process. When finishing the JPEG print setting process, the CPU 11 returns the display on the LCD 18 to the previous screen of the JPEG print option screen 87.

Returning to FIG. 9A, until any print instruction is input (in a case of No in STEP S908), the CPU 11 repeats the process of STEP S906 and the subsequent processes. If a print instruction is input (Yes in STEP S908), the CPU 11 determines the JPEG data corresponding to the currently displayed JPEG preview image 81, as the print target data, in STEP S909, and finishes the process.

In a case where the number of items of the target JPEG is 2 or more (Yes in STEP S902), in STEP S910, the CPU 11 displays the multiple JPEG display screen 80 on the LCD 18. Next, in STEP S912, the CPU 11 sets 1 for a variable M representing what number item of the target JPEG data should be displayed, and in STEP S914, the CPU 11 performs an image switch process.

Figure 9C:
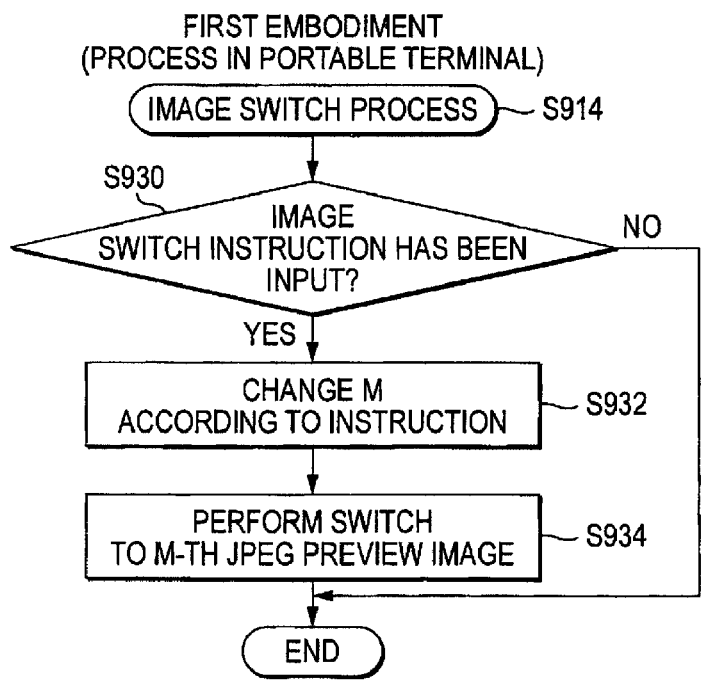

FIG. 9C is a flow chart illustrating the image switch process. If the user touches the image switch button 82 to input an image switch instruction (Yes in STEP S930), in STEP S932, the CPU 11 changes the variable M according to the number of times the image switch button 82 is manipulated. Specifically, in a case where the image switch button 82 for instructing transition to the next image is manipulated once, 1 is added to M, and in a case where the image switch button 82 for instructing transition to the previous image is manipulated once, 1 is subtracted from M.

Next, in STEP S934, the CPU 11 switches the displayed JPEG preview image 81 to an M-th JPEG preview image 81. Specifically, the CPU 11 loads the M-th item of the target JPEG data, generates the JPEG preview image 81, and displays the JPEG preview image 81 on the LCD 18. Meanwhile, in a case where any image switch button 82 is not touched by the user (No in STEP S930), the CPU 11 finishes the process.

Next, the CPU 11 returns to the process of STEP S916, and performs the JPEG print setting process in STEP S916. The JPEG print setting process is the same process as the JPEG print setting process described with reference to FIG. 9B, and thus the redundant description will not be repeated. Next, until any print instruction is input (in a case of No in STEP S918), the CPU 11 repeats the process of STEP S914 and the subsequent processes.

If a print instruction is input (Yes in STEP S918), in STEP S909, the CPU 11 determines the print target data. Specifically, in a case where the current image print button 85 is touched, the JPEG data corresponding to the currently displayed JPEG preview image 81 is determined as the print target data. Meanwhile, in a case where the full image print button 86 is touched, all of the target JPEG data is determined as the print target, and the process is finished.

Returning to FIG. 5, in STEP S508, the CPU 11 displays a stand-by screen (not shown) during printing, on the LCD 18. Then, in STEP S510, the CPU 11 transmits the JPEG data determined as the print target, to the device 30 designated by the option values stored in the JPEG print option memory 20d.

Referring to FIG. 6 again, according to the print-sharing selection process of STEP S504 shown in FIG. 6, even in a case where the data designated as the shared data is PDF data or JPEG data, it is possible to enable the user to select the print target by the PDF display process of STEP S612 or the JPEG display process of STEP S616.

Further, according to the print-sharing selection process of STEP S504, the option values received by the PDF print option screen 74 are applied for printing of the PDF preview image 67. Meanwhile, the option values received by the JPEG print option screen 87 (that is, the option values stored by the JPEG print option memory 20d) is applied for printing of the JPEG preview image 81. Since it is often that PDF data is data representing a document, and it is often that JPEG data is data representing a photo, it is often that the optimal option values for the PDF data are different from the optimal option values for the JPEG data. However, according to the print-sharing selection process of STEP S504, the options for print can be set for each format. Therefore, the operability when the setting for print is performed is good.

Figure 10B:
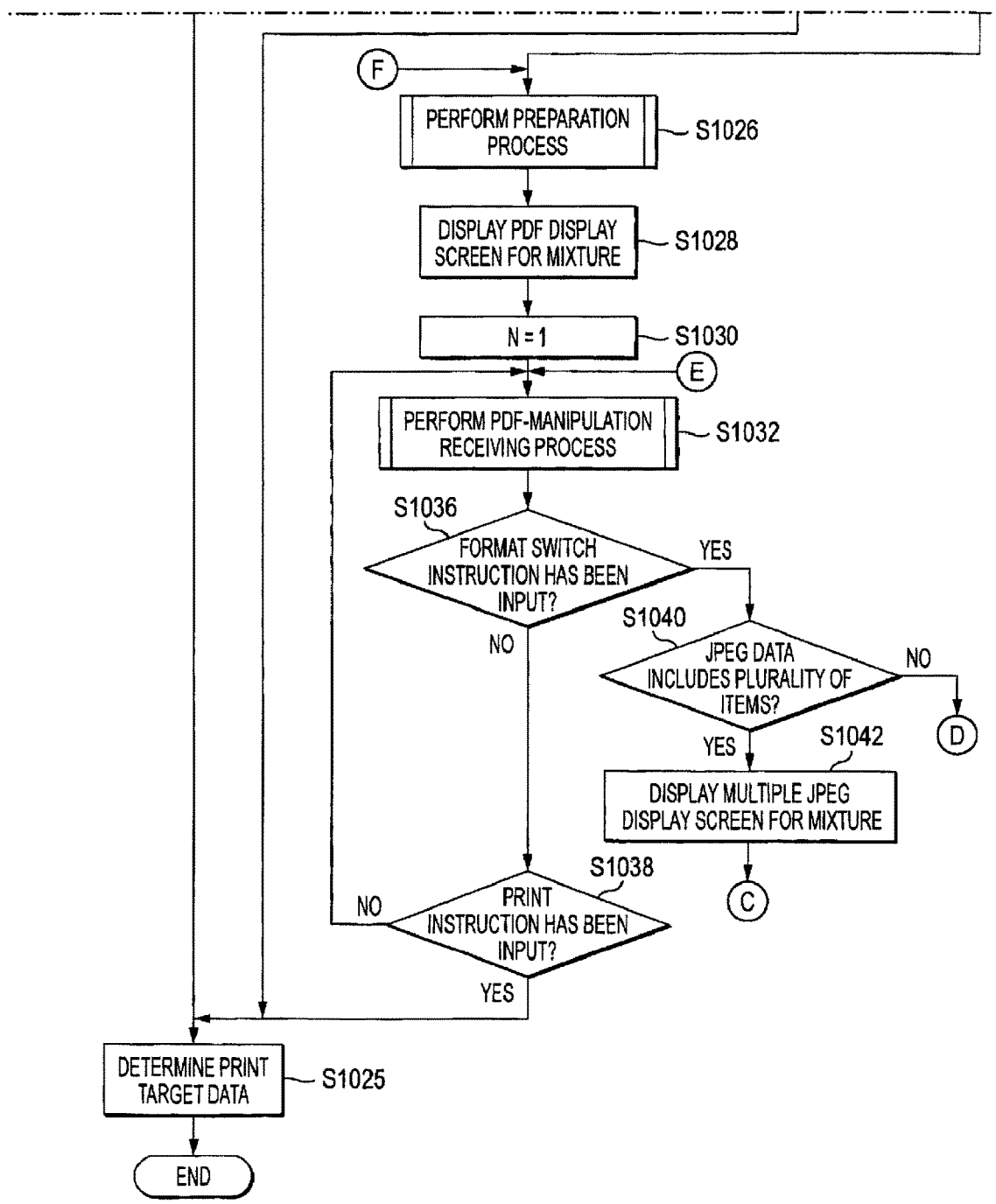

In the print-sharing selection process of STEP S504 shown in FIG. 6, in a case where there are '.jpg' and '.pdf' as the extensions of the shared data ('.jpg .pdf' in STEP S622), in STEP S624, the CPU 11 performs the simultaneous sharing process for PDF and JPEG FIG. 10 is a flow chart illustrating the simultaneous sharing process for PDF and JPEG This process is for sequentially switching the PDF preview images 67 and the JPEG preview images 81, in an order obtained by sorting the shared data, which is the source of the PDF preview images 67 and the JPEG preview images 81, on the basis of the formats.

First, in STEP S1002, the CPU 11 sorts the shared data on the basis of the formats. Specifically, the shared data is sorted such that the PDF preview images 67 simultaneously shared are displayed together and the JPEG preview images 81 simultaneously shared are displayed together. Further, the CPU 11 assigns a data number representing what number in the sorted order each item of the shared data corresponds to, to the corresponding item of the shared data.

Next, in a case where the first item, having the data number '1' assigned thereto, of the data designated as the shared data is PDF data (No in STEP S1004), in STEP S1026, the CPU 11 performs a preparation process of uploading the PDF data to the conversion server 300 such that the PDF data is converted into JPEG data. The preparation process is the same as the preparation process of STEP S702 shown in FIG. 7, and thus the redundant description will not be repeated.

Next, the CPU 11 displays the PDF display screen 93 for a mixture on the LCD 18 in STEP S1028, sets 1 for the variable N in STEP S1030, and performs a PDF-manipulation receiving process in STEP S1032. The PDF-manipulation receiving process is the same as the PDF-manipulation receiving process of STEP S712 shown in FIG. 7C, and thus the redundant description will not be repeated.

Next, in a case where the user touches the format switch button 95 (FIG. 4C) to instruct format switch (Yes in STEP S1036) and there is a plurality of items in JPEG data designated as the shared data (Yes in STEP S1040), the CPU 11 displays the multiple JPEG display screen 94 for a mixture including the JPEG preview image 81 generated on the basis of the M-th item of the JPEG data, on the LCD 18, in STEP S1042, and proceeds to STEP S1018. Meanwhile, in a case where there is a single item in the JPEG data designated as the shared data (No in STEP S1040), the CPU 11 proceeds to STEP S1007, and displays a single JPEG display screen for a mixture in STEP S1007. The single JPEG display screen for a mixture is the same as the multiple JPEG display screen 94 for a mixture (FIG. 4C) except that the image switch buttons 82 and the image number information 83 (FIG. 4A) are not included, and thus is not shown.

In a case where any format switch instruction is not input (No in STEP S1036) and any print instruction is not input (No in STEP S1038), the CPU 11 returns to STEP S1032, and repeats the process. Meanwhile, in a case where a print instruction is input (Yes in STEP S1038), the CPU 11 determines the print target JPEG data in STEP S1025, and finishes the process. In this case, the determination of the print target JPEG data performed in STEP S1025 is the same as the process performed in STEP S716 of FIG. 7A, and thus the redundant description will not be repeated.

Meanwhile, in a case where the first item of the shared data is JPEG data (Yes in STEP S1004), and there is a single item in the JPEG data designated as the shared data (No in STEP S1006), the CPU 11 displays the single JPEG display screen for a mixture on the LCD 18 in STEP S1007, and performs a JPEG print setting process in STEP S1008. This JPEG print setting process of STEP S1008 is the same as the JPEG print setting process of STEP S906 or STEP S916 described with reference to FIG. 9B, and thus the redundant description will not be repeated.

Next, in a case where the user touches the format switch button 97 (FIG. 4C) to input a format switch instruction (Yes in STEP S1009), in STEP S1011, the CPU 11 determines whether the conversion on the PDF data designated as the shared data has been completed. In a case where the result of the determination of STEP S1011 is negative (No in STEP S1011), the CPU 11 proceeds to STEP S1026. Meanwhile, in a case where the result of the determination of STEP S1011 is positive (Yes in STEP S1011), the CPU 11 displays the PDF display screen 93 for a mixture including the N-th PDF preview image 67, on the LCD 18, in STEP S1012, and proceeds to STEP S1032.

In a case where any format switch instruction is not input (No in STEP S1009), and any print instruction is not input (No in STEP S1010), the CPU 11 returns to STEP S1008 and repeats the process. In a case where a print instruction is input (Yes in STEP S1010), the CPU 11 determines the print target data in STEP S1025, and finishes the process. In the case, the determination of the print target JPEG data performed in STEP S1025 is the same as the process performed in STEP S909 of FIG. 9, and thus the redundant description will not be repeated.

In a case where there is a plurality of items in the JPEG data items designated as the shared data (Yes in STEP S1006), in STEP S1014, the CPU 11 displays the multiple JPEG display screen 94 for a mixture on the LCD 18. Next, in STEP S1016, the CPU 11 sets 1 for the variable M representing what number item of the target JPEG data should be displayed. Then, the CPU 11 performs an image switch process in STEP S1018, and performs a JPEG print setting process in STEP S1020. The image switch process of STEP S1018 and the JPEG print setting process of STEP S1020 are the same as the image switch process of FIG. 9C and the JPEG print setting process of FIG. 9B, respectively, and thus the redundant description will not be repeated.

Next, in a case where the user touches the format switch button 97 (FIG. 4C) to input a format switch instruction (Yes in STEP S1022), the CPU 11 proceeds to STEP S1011. Meanwhile, in a case where any format switch instruction is not input (No in STEP S1022), and any print instruction is not input (No in STEP S1024), the CPU 11 proceeds to STEP S1018. In a case where a print instruction is input (Yes in STEP S1024), the CPU 11 determines the print target data in STEP S1025, and finishes the process. In this case, the determination of the print target JPEG data performed in STEP S1025 is the same as the process performed in STEP S909 of FIG. 9A, and thus the redundant description will not be repeated.

According to the simultaneous sharing process for PDF and JPEG shown in FIG. 10, the PDF preview images 67 and the JPEG preview images 81 are sequentially switched in an order obtained by sorting the shared data, which is the source of the PDF preview images 67 and the JPEG preview images 81, on the basis of the formats. Therefore, even in a case where there are PDF data and JPEG data designated as the shared data, the user can easily recognize the format of the shared data that becomes the source of each image.

Further, the user can manipulate the format switch button 97 such that a desired format image of the PDF preview images 67 and the JPEG preview images 81 is displayed on the LCD 18, and the operability is good.

Returning to FIG. 5, in a case where the present application 14b is started although the start is not based the sharing function (No in STEP S502), in STEP S516, the CPU 11 displays a use selection menu screen (not shown) on the LCD 18. The use selection menu screen is for receiving a selection of any one of the PDF print process and the JPEG print process.

In a case where the user selects the JPEG print process in the use selection menu screen (Yes in STEP S520), in STEP S522, the CPU 11 displays a JPEG selection screen (not shown) on the LCD 18. The JPEG selection screen is a screen in which the thumbnails of the JPEG data stored in the memory card 20 are disposed as a list. Until a selection of a thumbnail is input (in a case of No in STEP S524), the CPU 11 stands by.

Meanwhile, if a selection of a thumbnail is input (Yes in STEP S524), in STEP S526, the CPU 11 performs a JPEG display process using the JPEG data corresponding to the selected thumbnail as the target data. This JPEG display process is the same as the JPEG display process of STEP S616 shown in FIG. 9A, and thus the redundant description will not be repeated.

In a case where the PDF print process is selected by the user (No in STEP S520), in STEP S530, the CPU 11 displays a PDF selection screen (not shown) on the LCD 18. This PDF selection screen is a screen in which the data names of the PDF data stored in the memory card 20 is disposed as a list. Until a selection of a data name is input (in a case of No in STEP S524), the CPU 11 stands by.

Meanwhile, if a case where a selection of a data name is input (Yes in STEP S532), in STEP S534, the CPU 11 performs a PDF display process using the PDF data of the selected data name as the target data. This PDF display process is the same as the PDF display process of STEP S612 shown in FIG. 7A, and thus the redundant description will not be repeated.

In the above-mentioned embodiment, the device 30 is an example of a print device, and the conversion server 300 is an example of an external apparatus. The page switch buttons 68 and the image switch buttons 82 are examples of a target switch object. The format switch buttons 95 and 97 are examples of a format switch object.

The CPU 11 is an example of a computer, a determining unit, a designating unit, a first switching unit, or a second switching unit. The wireless LAN transceiver 15 is an example of a print unit. The LCD 18 is an example of a display unit. The memory card 20 is an example of a storing unit. The telephone network communication unit 22 is an example of a transmitting unit. However, each of the determining unit, the designating unit, the first switching unit, the second switching unit, the print unit, the display unit, and the transmitting unit may be a single piece of hardware, or hardware which operates by executing the programs according to the present invention or programs such as an operating system other than the programs of the present invention. Each of those units may be hardware which is executed by a combination of processes according to a plurality of programs. Also, the storage unit may be a memory, such as the flash memory 14, built in the portable terminal 10.

Although the present invention has been described on the basis of the embodiment, it is easily inferable that the present invention is not limited to the above-mentioned embodiment, but may be variously modified for improvement without departing from the scope of the invention.

Figure 11A:
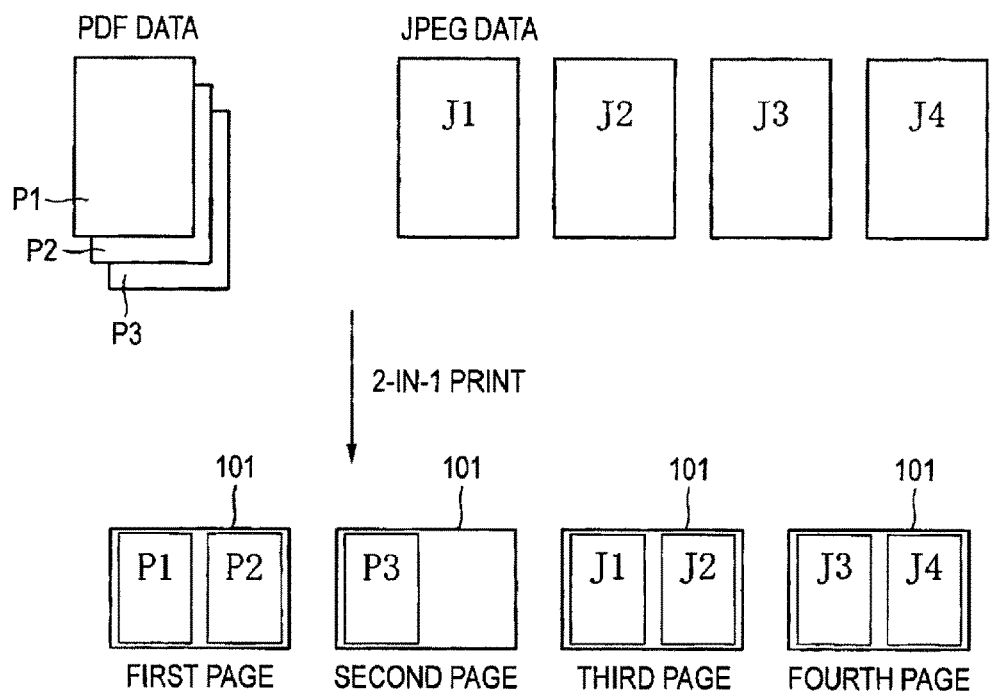
FIG. 11A is a view illustrating a relation between data designated as target data and print results of a case of N-in-1 printing of the target data according to a modification.

FIG. 11A is a view illustrating PDF data and JPEG data designated as target data, and print results of a case of N-in-1 printing of the target data, according to a modification. The N-in-1 print is a function for printing N-number of images on each print medium 101 (N is an integer of 2 or more), and is performed on the basis of a value of a layout option (see FIG. 3) included in the option values 76. In this modification, it is assumed for description that the same option values 76 are applied to PDF preview images P1 to P3 and JPEG preview images P1 to P4.

In a case of performing the N-in-1 print, the device control application 14b of the modification makes the CPU 11 calculates a print page number representing what number print medium 101 each preview image will be printed on. For example, after STEP S1002 shown in FIG. 10, STEP S1003 is provided, and in this step, the CPU 11 calculates the print page number. Next, on the LCD 18, while the N-number of preview images is displayed, the print page number 99 calculated with respect to the preview images is displayed.

Figure 11B:
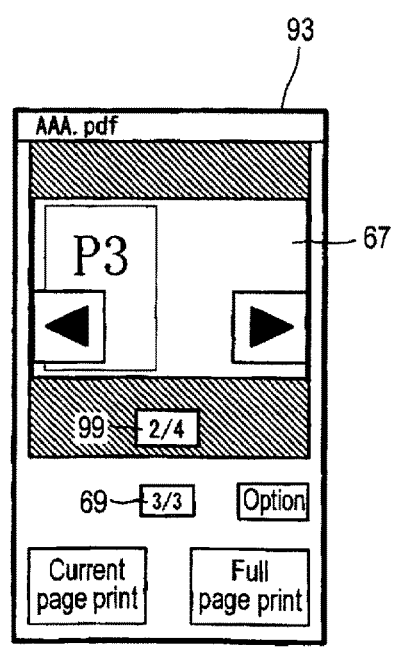
FIG. 11B is a view illustrating an example of a PDF display screen for a mixture that is displayed in an LCD of a portable terminal according to the modification.

FIG. 11B is a view illustrating an example of a PDF display screen 93 for a mixture which the device control application 14b of the modification displays on the LCD 18. Since the print page number 99 is displayed, it is possible to make the user recognize what number print medium 101 each image will be printed on, and the operability by the user is good.

As shown in FIG. 11B, together with the print page number 99, the total page number of print media 101 may be displayed. This modification can also be applied to a case where the N-in-1 print is performed without sorting the target data for every format, or a case where only data having a format selected by the user is extracted from the target data and the N-in-1 print of the extracted data is performed. In this modification, the CPU 11 is an example of a calculating unit, and STEP S1003 is an example of a print-page-number calculating means.

In the above-mentioned embodiment, the JPEG format is an example of a first format, and the PDF format is an example of a second format. However, the present invention is not limited thereto. Various formats such as a PNG format, a GIF format, a BMP format, a DOC format, and an XLS format can correspond to examples of the first format or the second format.

In the above-mentioned embodiment, PDF data of one item is designated as the target data. However, the present invention can also be applied to a case where PDF data of a plurality of items is designated as the target data.

In the above-mentioned embodiment, each display screen 65, 80, 92, 93, or 94 that displays the preview images transitions to the print option screen 74 or 87. However, the print option screen 74 or 87 may be displayed to overlap the display screen 65, 80, 92, 93, or 94 or a portion thereof, without screen transition.

In the above-mentioned embodiment, the page switch buttons 68, the image switch buttons 82, and the format switching buttons 95 and 97 are composed of images; however, they may be composed of character strings.

In the above-mentioned embodiment, the image switch buttons 82 are included and displayed in the multiple JPEG display screen 80. However, the image switch buttons 82 may not be displayed. In this case, it is possible to sensuously grasp whether the target data is data having a format including a plurality pages or data having a format including one page.

In the above-mentioned embodiment, in the portable terminal 10, the data name of the PDF data is read and stored in the memory card 20. Alternatively, the data name of the PDF data may be acquired form the conversion server 300, and may be stored in association with the JPEG data generated by converting the PDF data.

In the above-mentioned embodiment, a screen to be displayed is determined on the basis of the type notified from the OS 14a. However, the device control application 14b may be configured such that a screen to be displayed is determined on the basis of the extension of the shared data. Also, the manifest file of the device control application 14b may be configured such that the OS 14a determines which of the display screens 65, 80, 92, 93, and 94 should be displayed, on the basis of the type and the action notified from the sharing source application 52, and the transition destination 56 specified in the manifest file.

In the above-mentioned embodiment, in a case where there are JPEG data and PDF data designated as the shared data, displaying is performed in the sorted order. However, whether to perform sorting or a condition for sorting may be set by the user.

In the above-mentioned embodiment, in a case where the OS 14a does not notifies the type ('UNDESIGNATED' in STEP S610), and a case where it is determined that '.jpg' and '.pdf' are included as the extensions ('.jpg .pdf' in STEP S622), the CPU 11 performs a simultaneous sharing process for PDF and JPEG in STEP S624. However, in a case where shared data including a plurality of formats is designated, the sharing source application 52 may notify only one format of type to the OS 14a. Also, the sharing source application 52 may notify a dummy type to the OS 14a. In these cases, the type that is notified from the OS 14a to the shared data becomes one type.

Therefore, the print-sharing selection process (FIG. 6) of the above-mentioned embodiment may be modified such that the extensions of the shared data is determined, regardless of the type notified from the OS 14a, and in a case where the extensions of the PDF format and JPEG format are included, the simultaneous sharing process for PDF and JPEG is performed in the CPU 11.

In the above-mentioned embodiment, the portable terminal 10 transmits the JPEG data determined as the print target, and the option values, to the device 30 designated by the option values, in STEP S510, and the device 30 prints the JPEG data on the basis of the option values. However, the portable terminal 10 may generate print data from the JPEG data determined as the print target, on the basis of the option values, and transmit the print data to the device 30 designated by the option values. In this case, the device 30 performs printing on the basis of the print data received from the portable terminal 10.

In the above-mentioned embodiments, the portable terminal 10 having the communication function is an example of an information processing apparatus. However, various apparatuses having no communication function, such as a personal computer and a digital camera, can also be examples of the information processing apparatus. The present invention can also be applied to an apparatus that includes hardware keys capable of being manipulated for input without any touch panel.

Further, a server to which the portable terminal 10 uploads target data and a server which converts the target data and provides the converted data to the portable terminal 10 may be physically different apparatuses.

In the above-mentioned embodiments, the portable terminal 10 is connected to the Internet 200 through the portable-phone network 100 by the telephone network communication unit 22. However, the present invention can also be applied to a case where the portable terminal is connected to the Internet 200 through the access point 50 by the wireless LAN transceiver 15 in order for saving communication cost.

In the above-mentioned embodiment, in a case where the URI of the shared data is designated in the contents format, the temporary file, and when the PDF preview image 67 is displayed on the basis of the temporary file, the data name stored in association with the temporary file is displayed. However, the data name may not be displayed. The temporary file may be removed regardless of an instruction of the user, according to the present application 14b. This is because there is a little need to make the user recognize the data name.

The aspect of the present disclosure can be implemented in various forms such an information processing apparatus, a control device for controlling an information processing apparatus, an information processing system, an information processing method, and a recording medium for recording an information processing program.

According to the information processing apparatus of the first aspect, the first data name of the first-kind data designated as the target data is displayed together with each display image on the display unit. Therefore, even in a case where a display image generated using the second-kind data is displayed on the display unit, it is possible to make the user visibly recognize the first data name of the first-kind data, and thus it is difficult to give the user a feeling of strangeness.

Further, according to the information processing apparatus, even when the second-kind data including a plurality of items is generated from the first-kind data, it is possible to display each of a plurality of display images generated using the plurality of items of the second-kind data, together with the first data name of the first-kind data, and thus it is difficult to give the user a feeling of strangeness.

According to the information processing apparatus, the first data name may be displayed together with an extension representing the first format. Therefore, it is possible to make each display image look as it has been displayed on the basis of data having the first format, to the user, and thus it is difficult to give the user a feeling of strangeness.

Further, according to the information processing apparatus, not only in a case where the target data is the first-kind data but also in a case where the target data is the second-kind data, it is possible to display display images. In the case where the target data is the first-kind data, it is possible to display each display image together with the first data name.

According to the information processing apparatus, even in a case where the target data is designated in a contents format, it is possible to display each display image together with a data name.

According to the information processing apparatus, display images of a group are sequentially switched in an order of the display images sorted on the basis of the formats of the target data that are sources of the display images. Therefore, even in a case where the target data includes the first-kind data and the second kind-data, the user can easily recognize the format of the target data that is the source of each display image.

Further, according to the information processing apparatus, it is possible to perform a switch between a display by the first display control means and a display by the second display control means, by a simple manipulation of the user.

According to the information processing apparatus, in a case of making an option screen be displayed in a state in which a display image has been displayed by the first display control means, and setting of values for options is received in the option screen, the option values may be applied for printing display images that are displayed by the first display control means. Meanwhile, in a case of making an option screen be displayed in a state in which a display image has been displayed by the second display control means, and setting of values for options is received in the option screen, the option values may be applied for printing display images that are displayed by the second display control unit. Therefore, operability when setting for printing is performed is good.

According to the information processing apparatus, it is possible to make the user visibly recognize appropriate options according to each display image of the print target, and operability when setting for printing is performed is good.

According to the information processing apparatus, a page number associated with the second-kind data used for generating each display image, and the total number of pages included in the first-kind data may be displayed. Therefore, it is possible to make the user easily understand the structure of the first-kind data. For example, the user can easily understand whether the first-kind data which is the source of a currently displayed display image includes any other page.

According to the information processing apparatus, the total number of items of data designated as the target data, and item number information representing what number item of the target data the currently displayed display image corresponds to may be displayed. Therefore, the user can easily understand how many items other than the item of the target data corresponding to the currently displayed display image are in the target data.

According to the information processing apparatus, in a case of printing a plurality of display images on each print medium, each display image may be displayed together with a print page number representing what number print medium the corresponding display image will be printed on. Therefore, the operability by the user is good.

According to an information processing program of a second aspect, it is possible to achieve the same effects as those of an information processing apparatus including a computer that executes the information processing program of the first aspect.

According to an information processing method of a third aspect, it is possible to achieve the same effects as those of an information processing apparatus including a computer that executes the information processing program of the first aspect.

What is claimed is:
1. An information processing apparatus comprising:
a memory configured to store first-kind image data which data having a first format designated as target data and store a first file name of the first-kind image data, the first file name including a first data name representing the first format;
a display; and
a controller configured to execute: controlling to acquire the first-kind image data which data is stored in the memory; controlling to acquire second-kind image data which is generated by converting the acquired first-kind image data, the second-kind image data being data being of a second format different from the first format, and acquire a second file name of the second-kind image data, the second file name including a second data name representing the second format different from the first data name;
controlling the display to display a display image of the acquired second-kind image data, together with the first file name including the first data name stored in the memory without displaying the second data name associated with the second-kind image data;
determining a contents format of the data designated as the target data: controlling the display to display the display image generated using the second-kind image data if it is determined that the target data has the second format: and controlling the memory to store the first data name of the first-kind image data if it is determined that the target data has the first format:

wherein the memory stores the second-kind image data in association with the first data name stored in the memory.

2. The information processing apparatus according to claim 1, wherein: the first format is a format capable of storing data of a plurality of pages in one data unit, and in a case where the first-kind image data includes data of the plurality of pages, the controller acquires the second-kind image data of a plurality of items each of which stores data of one page in one data unit and stores the plurality of items of the second-kind image data in association with the first data name of the first-kind image data.

3. The information processing apparatus according to claim 1, wherein: the first data name displayed on the display by the display includes an extension representing that the target data has the first format.

4. The information processing apparatus according to claim 1, wherein controller is configured to execute controlling the display to display a target switch object on the display together with the display image, the target switch object being for receiving a target switching instruction for switching an image to be the display image, the information processing apparatus further comprises a switching unit configured to switch the display image every time the target switching instruction is received by the target switch object, and in a case where the target data includes the first-kind image data and the second-kind image data, the switching unit sequentially switches a group of display images to be displayed by the display, in an order obtained by sorting the group of display images on the basis of the contents formats of the target data that is the source of the group of display images.

5. The information processing apparatus according to claim 1, wherein the controller is configured to: in a case where the target data includes the first-kind image data and the second-kind image data, control the display to display a format switch object on the display together with the display image, the target switch object being for receiving a format switching instruction for switching a kind of the display image, and switch the display image displayed on the display from one of the display image displayed by the first display control instruction and the display image displayed by the second display control instruction to the other if the format switching instruction is received by the format switch object.

6. The information processing apparatus according to claim 1, wherein the controller is further configured to control the display to display an option screen for receiving setting of option values for print;

control the memory to store the option values if the setting of the option values is received from the option screen displayed by the display in a state where the display image has been displayed by the display; control the memory to store the option values if the setting of the option values is received from the option screen displayed by the display in a state where the display image has been displayed by the display; and output, to a print device, a print instruction based on the option values stored by the memory, in association with the display image associated with the first format, and to output, to the print device, the print instruction based on the option values stored by the memory, in association with the display image associated with the second format.

7. The information processing apparatus according to claim 6, wherein: the option screen shows various options and the option values for the options, and the option screen displayed in a case where the display image has been displayed includes options different from those of the option screen displayed by the display in a case where the display image has been displayed.

8. The information processing apparatus according to claim 1, wherein the first format is a format capable of data of a plurality of pages in one data unit and plural items of the second-kind image data are provided, the information processing apparatus comprises a page-number-storage control unit configured to control the memory to store a page number of each page included in the first-kind image data having the first format, in association with the second-kind image data generated by converting data of the corresponding page, and the controller controls the display to display each display image, the page number associated with the second-kind image data used for generating the corresponding display image, and a total number of pages of the first-kind image data which is the source of the second-kind image data.

9. The information processing apparatus according to claim 1, wherein the controller controls the display to display each display image, a number of pages of the data designated as the target data, and page number information representing what number item of the target data a currently displayed display image corresponds to.

10. The information processing apparatus according to claim 1, wherein the controller is further configured to in a case of printing n-number of display images displayed by the first display control instruction and the second display control instruction, n being designated by a layout option which designates the number of the display images to be printed on one print medium, calculates a print page number representing what number page of the print media each display image of the group of display images will be printed on, and controls the display to display each display image, and the print page number calculated with respect to the corresponding display image.

11. The information processing apparatus according to claim 1, wherein the second-kind image data is a preview image corresponding to the first-kind image data.

12. A non-transitory computer readable recording medium storing an information processing program to be executed by a computer of an information processing system including a memory storing first-kind image data, and a display, the first-kind image data being data having a first format designated as target data, the first-kind image data stored with a first file name of the first-kind image data, the first file name including a first data name representing the first format, the information processing program comprising:

a second-kind-data-storage control instruction that causes the memory to store second-kind image data, the second-kind image data being generated by converting the first-kind image data, the second-kind image data being of a second format different form the first format, and receive a second file name of the second-kind image data, the second file name including a second data name representing the second format different from the first data name;

a first display control instruction that causes the display to display a display image of the second-kind image data, together with the first file name including the first data name stored in the memory without displaying the second data name associated with the second-kind image data;

wherein the memory stores instructions which cause the information processing program to perform:

causing the computer to determine a contents format of the data designated as the target data;

causing the display to display the display image generated using the second-kind image data if the computer determines that the target data has the second format; and causing the memory to store the first data name of the first-kind image data if the computer determines that the target data has the first format, and wherein the second-data-storage control instruction causes the memory to store second-kind-image data stored in the memory, in association with the first data name stored by the data name storing unit.

13. The non-transitory computer readable recording medium according to claim 12, wherein:

the first format is a format capable of storing data of a plurality of pages in one data unit, and in a case where the first-kind image data includes data of a plurality of pages, the second-kind-data-storage control instruction causes the computer to acquire the second-kind image data of a plurality of items each of which stores data of one page in one data unit, and causes the memory to store the plurality of items of the second-kind image data in association with the first data name of the first-kind image data.

14. The non-transitory computer readable recording medium according to claim 12, wherein: the first data name displayed on the display by the first display control instruction includes an extension representing that the target data has the first format.

15. The non-transitory computer readable recording medium according to claim 12, wherein the program includes:

an option-screen display instruction that causes the display to display an option screen for receiving setting of option values for print;

a first setting instruction that causes the memory to store the option values if the setting of the option values is received from the option screen displayed by the option-screen display instruction in a state where the display image has been displayed by the first display control instruction;

a second setting instruction that causes the memory to store the option values if the setting of the option values is received from the option screen displayed by the option-screen display instruction in a state where the display image has been displayed by the second display control instruction; and a print instruction that causes the computer to output, to a print device, the print instruction based on the option values stored by the memory, in association with the display image displayed by the first display control instruction, and causes the computer to output, to the print device, the print instruction based on the option values stored by the second setting means, in association with the display image displayed by the second display control instruction.

16. The non-transitory computer readable recording medium according to claim 12, wherein the first format is a format capable of data of a plurality of pages in one data unit and plural items of the second-kind image data are provided, the program includes a page-number-storage control instruction that causes the memory to store a page number of each page included in the first-kind image data having the first format, in association with the second-kind image data generated by converting data of the corresponding page, and the first display control instruction causes the display to display each display image, the page number associated with the second-kind image data used for generating the corresponding display image, and a total number of pages of the first-kind image data which is the source of the second-kind image data.

17. An information processing apparatus comprising:

a memory configured to store first-kind image data which data having a first format designated as target data and store a first file name of the first-kind image data, the first file name including a first data name representing the first format;

a display; and a controller configured to execute:

controlling to acquire the first-kind image data which data is stored in the memory;

controlling to acquire second-kind image data which is generated by converting the acquired first-kind image data, the second-kind image data being data being of a second format different from the first format, and acquire a second file name of the second-kind image data, the second file name including a second data name representing the second format different from the first data name;

controlling the display to display a display image of the acquired second-kind image data, together with the first file name including the first data name stored in the memory without displaying the second data name associated with the second-kind image data;

controlling the memory to store the target data as a temporary file in a case where the target data is designated and the designation is performed in a contents format;

controlling the memory to store a data name in association with the temporary file stored in the memory; and controlling the display to display the display image generated using the temporary file stored by the memory, and the data name associated with the temporary file.

18. A non-transitory computer readable recording medium storing an information processing program to be executed by a computer of an information processing system including a memory storing first-kind image data, and a display, the first-kind image data being data having a first format designated as target data, the first-kind image data stored with a first file name of the first-kind image data, the first file name including a first data name representing the first format, the information processing program comprising:

a second-kind-data-storage control instruction that causes the memory to store second-kind image data, the second-kind image data being generated by converting the first-kind image data, the second-kind image data being of a second format different form the first format, and receive a second file name of the second-kind image data, the second file name including a second data name representing the second format different from the first data name;

a first display control instruction that causes the display to display a display image of the second-kind image data, together with the first file name including the first data name stored in the memory without displaying the second data name associated with the second-kind image data;
wherein the memory stores instructions which cause the information processing program to perform:
causing the memory to store the target data as a temporary file in a case where the target data is designated and the designation is performed in a contents format;
causing the memory to store a data name in association with the temporary file stored in the memory; and
causing the display to display the display image generated using the temporary file stored by the memory, and the data name associated with the temporary file.

* * * * *